United States Patent
Jiang et al.

(10) Patent No.: US 12,303,881 B2
(45) Date of Patent: May 20, 2025

(54) POROUS COMPOSITE MATERIAL CAPABLE OF GENERATING ELECTRIC ARC IN MICROWAVE FIELD, PREPARATION METHOD THEREFOR, AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Haibin Jiang, Beijing (CN); Jinliang Qiao, Beijing (CN); Xiaohong Zhang, Beijing (CN); Wenlu Liu, Beijing (CN); Zhihai Song, Beijing (CN); Guicun Qi, Beijing (CN); Jianming Gao, Beijing (CN); Chuanlun Cai, Beijing (CN); Binghai Li, Beijing (CN); Xiang Wang, Beijing (CN); Jinmei Lai, Beijing (CN); Yue Ru, Beijing (CN); Hongbin Zhang, Beijing (CN); Peng Han, Beijing (CN); Wenqing Huang, Beijing (CN); Jiangru Zhang, Beijing (CN); Yating Zhao, Beijing (CN); Chao Jiang, Beijing (CN); Shuqi Sun, Beijing (CN); Zhaoyan Guo, Beijing (CN); Song Chen, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 862 days.

(21) Appl. No.: 17/309,134

(22) PCT Filed: Sep. 27, 2019

(86) PCT No.: PCT/CN2019/108632
§ 371 (c)(1),
(2) Date: Apr. 29, 2021

(87) PCT Pub. No.: WO2020/088173
PCT Pub. Date: May 7, 2020

(65) Prior Publication Data
US 2022/0008882 A1    Jan. 13, 2022

(30) Foreign Application Priority Data

Oct. 29, 2018  (CN) .......................... 201811264415.4
Oct. 29, 2018  (CN) .......................... 201811264420.5

(Continued)

(51) Int. Cl.
*B01J 6/00*     (2006.01)
*C04B 38/00*   (2006.01)
(Continued)

(52) U.S. Cl.
CPC ........... *B01J 6/008* (2013.01); *C04B 38/0054* (2013.01); *C04B 41/009* (2013.01);
(Continued)

(58) Field of Classification Search
None
See application file for complete search history.

(56) References Cited

U.S. PATENT DOCUMENTS

| 5,084,140 A | 1/1992 | Holland |
| 5,476,684 A * | 12/1995 | Smith ............... C04B 35/62863 427/419.7 |

(Continued)

FOREIGN PATENT DOCUMENTS

| CN | 1290670 A | 4/2001 |
| CN | 1793039 A | 6/2006 |

(Continued)

OTHER PUBLICATIONS

Google translation of JP2011243412A (Year: 2011).*
Lam, Su Shiung et al., Catalytic microwave pyrolysis of waste engine oil using metallic pyrolysis char, Applied Catalysis B: Environmental, vol. 176-177, Apr. 9, 2015, pp. 601-617.
Liu, Wenlu et al.; Conductive Graphene-Melamine Sponge Prepared via Microwave Irradiation; ACS Appl. Mater. Interfaces, vol. 10, No. 29, Jul. 3, 2018, pp. 24776-24783.
You, Xiaoying et al.; Research and Development of Microwave Pyrolysis of Biomass for Renewable fuel Production; Chinese Agricultural Science Bulletin; vol. 11, pp. 33-38, Apr. 15, 2016.
(Continued)

*Primary Examiner* — Ali Z Fadhel
(74) *Attorney, Agent, or Firm* — NKL Law; Allen Xue

(57) ABSTRACT

A porous composite material capable of generating an arc in a microwave field includes an inorganic porous framework and a carbon material loaded on the inorganic porous framework. The average pore size of the inorganic porous framework is 0.2-1000 μm. The porous composite material has an excellent mechanical performance, can generate an arc in a microwave field to quickly generate a high temperature, and thus can be used in fields such as microwave high-temperature heating, biomass pyrolysis, vegetable oil treatment, waste polymer material pyrolysis, petrochemical pyrolysis, carbon-fiber composite material recovery, waste treatment, VOC waste gas treatment, COD wastewater treatment, high-temperature catalysis, waste circuit board full-component recycling, and hydrogen preparation.

26 Claims, No Drawings

(30) Foreign Application Priority Data

| Oct. 29, 2018 | (CN) | 201811264422.4 |
|---|---|---|
| Oct. 29, 2018 | (CN) | 201811264424.3 |
| Oct. 29, 2018 | (CN) | 201811264425.8 |
| Oct. 29, 2018 | (CN) | 201811264432.8 |
| Oct. 29, 2018 | (CN) | 201811264439.X |
| Oct. 29, 2018 | (CN) | 201811264451.0 |
| Oct. 29, 2018 | (CN) | 201811264452.5 |
| Oct. 29, 2018 | (CN) | 201811264454.4 |
| Oct. 29, 2018 | (CN) | 201811264455.9 |

(51) Int. Cl.

| C04B 41/00 | (2006.01) |
|---|---|
| C04B 41/50 | (2006.01) |
| C04B 41/87 | (2006.01) |
| C10B 19/00 | (2006.01) |
| C10B 53/02 | (2006.01) |
| C10B 53/07 | (2006.01) |
| C10G 1/04 | (2006.01) |
| C10G 1/10 | (2006.01) |
| F23G 5/10 | (2006.01) |
| H05B 6/64 | (2006.01) |

(52) U.S. Cl.
CPC .......... *C04B 41/5001* (2013.01); *C04B 41/87* (2013.01); *C10B 19/00* (2013.01); *C10B 53/02* (2013.01); *C10B 53/07* (2013.01); *C10G 1/04* (2013.01); *C10G 1/10* (2013.01); *F23G 5/10* (2013.01); *H05B 6/6491* (2013.01); *C10G 2300/1003* (2013.01); *C10G 2300/1007* (2013.01); *C10G 2300/1014* (2013.01); *F23G 2204/203* (2013.01)

(56) References Cited

U.S. PATENT DOCUMENTS

| 5,810,912 | A * | 9/1998 | Akiyama | B01D 67/0046 96/11 |
|---|---|---|---|---|
| 6,184,427 | B1 | 2/2001 | Klepfer et al. | |
| 2010/0273051 | A1 * | 10/2010 | Choi | H01M 4/045 429/218.1 |
| 2014/0155661 | A1 | 6/2014 | Frediani et al. | |
| 2014/0183415 | A1 * | 7/2014 | Song | B82Y 30/00 252/502 |
| 2015/0099199 | A1 * | 4/2015 | Bazant | H01M 8/20 429/495 |
| 2017/0081197 | A1 * | 3/2017 | Park | C01B 32/97 |
| 2018/0145316 | A1 * | 5/2018 | Moon | H01M 4/134 |
| 2018/0212250 | A1 * | 7/2018 | Zhamu | H01M 4/362 |
| 2018/0334410 | A1 * | 11/2018 | Zeng | C04B 41/4529 |
| 2020/0044241 | A1 * | 2/2020 | Gigler | H01M 4/1395 |
| 2020/0136130 | A1 * | 4/2020 | Choi | H01M 4/1393 |
| 2021/0126258 | A1 * | 4/2021 | Bell | H01M 4/0435 |

FOREIGN PATENT DOCUMENTS

| CN | 1898017 | A | 1/2007 |
|---|---|---|---|
| CN | 1940005 | A | 4/2007 |
| CN | 101215387 | A | 7/2008 |
| CN | 101934094 | A | 1/2011 |
| CN | 102168325 | A | 8/2011 |
| CN | 2011243412 | A | 12/2011 |
| CN | 102585860 | A | 7/2012 |
| CN | 102709569 | A | 10/2012 |
| CN | 103100365 | A | 5/2013 |
| CN | 103252226 | A | 8/2013 |
| CN | 103268929 | A | 8/2013 |
| CN | 103849008 | A | 6/2014 |
| CN | 104475019 | A | 4/2015 |
| CN | 104560091 | A | 4/2015 |
| CN | 104576085 | A | 4/2015 |
| CN | 104785183 | A | 7/2015 |
| CN | 104817337 | A | 8/2015 |
| CN | 104926290 | A | 9/2015 |
| CN | 105439563 | A | 3/2016 |
| CN | 105461043 | A | 4/2016 |
| CN | 105586091 | A | 5/2016 |
| CN | 105646946 | A | 6/2016 |
| CN | 105728711 | A | 7/2016 |
| CN | 105845937 | A | 8/2016 |
| CN | 106467412 | A | 3/2017 |
| CN | 106520176 | A | 3/2017 |
| CN | 106629690 | A | 5/2017 |
| CN | 106675595 | A | 5/2017 |
| CN | 106675661 | A | 5/2017 |
| CN | 107129298 | A | 9/2017 |
| CN | 107344855 | A | 11/2017 |
| CN | 108079934 | A | 5/2018 |
| CN | 108191460 | A | 6/2018 |
| CN | 108475779 | A | 8/2018 |
| CN | 108484190 | A | 9/2018 |
| CN | 108546340 | A | 9/2018 |
| CN | 108609603 | A | 10/2018 |
| EP | 1449819 | A1 | 8/2004 |
| EP | 2692425 | A1 | 2/2014 |
| JP | H04273195 | A | 9/1992 |
| JP | 3699992 | B2 | 9/2005 |
| JP | 4110244 | B2 | 7/2008 |

OTHER PUBLICATIONS

Zhao, Donglin et al.; Preparation and Microwave Absorbing Properties of Microwave Absorbing Materials Containing Carbon Nanotubes; journal of Inorganic Materials; vol. 20, No. 3, May 20, 2005, pp. 608-612.

* cited by examiner

POROUS COMPOSITE MATERIAL CAPABLE OF GENERATING ELECTRIC ARC IN MICROWAVE FIELD, PREPARATION METHOD THEREFOR, AND USE THEREOF

TECHNICAL FIELD

The present invention relates to the fields of microwave heating, microwave high-temperature pyrolysis and waste resource utilization, specifically, relates to a porous composite material capable of generating electric arcs in a microwave field, a preparation method therefor and use thereof, and a method of pyrolyzing and/or recycling substances comprising organic compounds.

BACKGROUND ART

More than 90% of chemical raw materials come from fossil energy such as petroleum, shale gas and coal. However, fossil energy is non-renewable and will produce $CO_2$ during its use. Therefore, currently, the development of an environmentally friendly renewable energy has become one of the focuses in the energy field. For more sustainable economic and social development, there is an urgent need to replace the fossil energy with renewable biomass energies. Among them, vegetable oil has become a research focus due to its characteristics such as low price and large-scale cultivation. From 2012 to 2013, a total of 462 million tons of major vegetable oils such as palm oil, rapeseed oil, sunflower oil and soybean oil were produced in the world. In recent years, the rapid development of pyrolysis technology has made it one of the relatively efficient and mature biomass utilization technologies.

In another aspect, ever since the 1950s, humans have produced 8.3 billion tons of plastics, of which 6.3 billion tons have become waste. Of the 6.3 billion tons of waste plastics, 9% is recycled, 12% is incinerated, and the remaining 79% (nearly 5.5 billion tons) is buried in landfills or accumulated in the natural environment. Humans are still accelerating the production rate of plastics. At present, the annual output of plastics has reached 400 million tons. It is estimated that by the year 2050, there will be 12 billion tons of waste plastics in the world. Every year, more than 8 million tons of plastics end up in the ocean. If no restrictions are imposed, there will be more plastic garbage in the ocean than fish by the year 2050. In recent years, top international publications have successively published the pollution of plastic particles to the organisms in the ocean and rivers and to drinking water, which has aroused the concern of the whole society on plastic pollution. In 2018, the United Nations Environment Programme focused for the first time on the issue of pollution caused by disposable plastics, and announced "Beat Plastic Pollution" as the theme of the World Environment Day, calling on the whole world to "declare war" on plastic pollution.

To solve the problem of plastic pollution, scientific researchers have made unremitting efforts. Ever since 1970, there has been a lot of research devoted to the preparation of plastics that are degradable in the natural environment. However, degradable plastics have important applications only in biomedicine, agricultural mulch film and garbage bags, etc., and in occasions in need of recycle, the presence of degradable plastics will seriously affect the performance of recycled plastic articles. Moreover, degradable plastics still take a relatively long time to degrade in non-ideal natural environments, thus the problem of white pollution cannot be effectively solved.

At present, mechanical recycling is the only widely-used technical solution for treating waste plastics. The main steps are successively removal of organic residues, washing, crushing, and melting and reprocessing, and in the process of melting and reprocessing, it is generally necessary to blend new materials to maintain the performance. Different plastics respond differently to the processing process, which makes the technical solution of mechanical recycling applicable to only a few types of plastics. At present, actually, only polyethylene terephthalate (PET) and polyethylene (PE) are recycled with said technology, accounting for 9% and 37% of the annual plastic output, respectively. Temperature-sensitive plastics, composite materials, and plastics that do not melt and flow at elevated temperatures (such as thermosetting plastics) cannot be treated by this method.

The chemical recycling method that prepares waste plastics into small molecular hydrocarbons (gas, liquid oil or solid wax) through a chemical conversion or a thermal conversion is considered to be a technical solution that can surpass mechanical recycling, and the resulting products can be used as fuels or chemical raw materials. However, this technical solution has not been widely used at present, mainly due to the high cost. On the one hand, most of the chemical recycling processes require expensive catalysts, and the selectivity of the catalyst requires that the raw material must be pure polymers, which requires time-consuming and labor-intensive sorting of waste plastics. On the other hand, the chemical recycling process consumes a lot of energy.

In another aspect, with the rapid development of the world economy, rubber materials are widely used in various industries, and thus the demand for rubber products is also increasing. The emergence of automobiles has brought great convenience to the production and life of humans and promoted the progress of the society. At the same time, it also brought some hidden dangers that are hard to ignore, that is, the aggravation of the environment and resource problems. With the increase in automobile manufacture year by year, the consumption of the resources and the amount of discarded tires continue to increase. China has a vast territory and a large population, and is a big country that uses tires. Discarded tires occupy a lot of land resources and environmental space, and further, for the unknown time required for the decomposition of waste tires, they are not only uneasy for compaction cleanup, but also difficult to biodegrade. Waste tires cause great harms to the environment and are difficult to treat, thus they are called "black pollution". The reutilization of waste rubber resource has become an urgency.

According to another aspect, carbon fiber composite materials have such excellent properties as light weight, high strength, and good corrosion resistance, and are widely used in high-tech fields such as aerospace, new energy, automobile industry, and sports goods. With the widespread application of the carbon fiber composite materials, the carbon fiber composite material waste as generated is increasing day by day. A large amount of carbon fiber composite material waste has attracted people's attention, which has a huge impact on environmental protection and economic benefits. As people pay more and more attention to environmental protection and the international situation causes energy and resource crisis, and further the carbon fiber in the carbon fiber composite materials has a high price and excellent overall performance, research on carbon fiber recycling technology is an important development trend in the future.

The current carbon fiber recycling technology methods mainly include physical recycling method and chemical recycling method. The physical recycling method is to pulverize or melt the carbon fiber composite material waste as the raw material for new materials. However, this method will damage the properties of various components of the composite material, especially we cannot obtain carbon fiber therefrom, and cannot achieve recyclability. Chemical recycling is a method that utilizes thermal decomposition or organic solvent decomposition to recycle carbon fiber from the carbon fiber composite material waste. Recycling by organic solvents decomposition obtains clean carbon fiber, but uses a large amount of organic solvents, which may pollute the environment. The separation of the used solvent (liquid separation, extraction, distillation, etc.) is complicated in operation, resulting in high recycling cost. Moreover, this method is selective to the type of the matrix resin of the carbon fiber reinforced resin composite material and even the type of the curing agent, and thus it is not suitable for all matrix resins. The most industrially feasible one disclosed in the prior art is the thermal decomposition of the carbon fiber composite materials. However, traditional heating manners generally have a low efficiency, which makes the energy cost too high.

Printed circuit board (PCB) is an essential component of almost all the electronic information products and widely used in various industrial fields such as electronic components and electric control. As the substrate material in PCB manufacturing, copper clad laminate is mainly composed of three parts: a substrate, copper foil and an adhesive. The substrate is composed of a polymer synthetic resin and a reinforcing material. The adhesive is usually phenol resin, epoxy resin, polyimide resin, cyanate ester resin, polyphenylene ether resin, etc. As early as the year 2000, China's annual output of copper clad laminate had reached 160,100 tons. In 2006, China's printed circuit board output surpassed Japan and became the printed circuit board producer with the largest output value in the world. So far, about 40% of the world's PCB is produced in China, while the amount of the waste printed circuit boards (WPCB) is also huge. Existing WPCB treatment methods such as mechanical treatment and acid dissolution mostly focus on the recycling of the metals in circuit boards, while rarely involve the effective recycling of the non-metal ingredients in circuit boards; further, most of these methods pose a great threat to environmental safety. Therefore, devising a clean and efficient WPCB treatment method is one of the hot issues of current research.

Microwave refers to an electromagnetic wave having a wavelength between infrared ray and ultrahigh frequency (UHF) radio wave, and has a very strong penetrating ability, a wavelength between 1 m and 1 mm, and a corresponding frequency of 300 GHz-300 MHz. The magnetron of the microwave generator receives the power of the power source to generate microwaves, which are transferred to the microwave heater via the waveguide, and the material to be heated is heated under the action of the microwave field. The microwave heating mode is quite different from an ordinary heat transfer. The high-frequency electric field periodically changes the applied electric field and direction at a speed of hundreds of millions per second, so that the polar molecules in the material vibrate at a high frequency with the electric field, and by the friction and squeeze action between molecules, the material heats up rapidly, thereby the internal temperature and surface temperature of the material simultaneously rise rapidly.

Recently, a microwave pyrolysis technology without the use of a catalyst has been developed. This technology has a high energy efficiency and can simultaneously treat different types of waste plastics that have been polluted to some extent, such as the currently most commonly-used polyethylene, polypropylene, polyester, polystyrene and polyvinyl chloride, to pyrolyze them into chemical raw materials. In addition, the microwave pyrolysis technology is also used to pyrolyze waste rubber into monomers which are then re-polymerized for use. Therefore, the microwave pyrolysis technology is expected to become the key to solving the problem of plastic pollution and to reutilizing rubber resources.

Many patents have disclosed the technology of pyrolysis using this characteristic of the microwave, such as the CN patent application publication CN102585860A, CN103252226A, CN106520176A, etc., but they all use ordinary microwave sensitive materials such as silicon carbide to generate heat in the microwave field and transfer the heat to the material to be pyrolyzed, thereby achieving the pyrolysis purpose. Such manner fails to achieve a high working temperature and an ideal efficiency and product composition. Therefore, it is still necessary to develop a microwave heating material that can quickly generate a high temperature in a microwave field and transfer heat to materials, to develop an efficient method for the microwave high-temperature pyrolysis of waste plastic, waste rubber, biomass or vegetable oil, and to develop an efficient method for microwave high-temperature pyrolysis of carbon fiber composite material and recycling of the carbon fiber, and a method for the microwave high-temperature pyrolysis of circuit board to achieve effective resource recycling. The development of such materials and methods has huge application prospects.

DISCLOSURE OF THE INVENTION

In view of the problems in the prior art, the object of the present invention is to provide a porous composite material and its preparation method and use. The porous composite material can generate electric arcs in a microwave field to quickly (for example, within dozens of seconds to several minutes) generate a high temperature (especially above 1000° C.), thereby achieving effective microwave high-temperature heating of or microwave pyrolysis of substances comprising organic compounds (for example, plastics, such as polyethylene, polypropylene and polystyrene; rubbers; vegetable oils; biomasses; carbon fiber composite materials; circuit boards) and recycling of valuable substances in the pyrolyzed products as chemical raw materials or for applications in other aspects. In addition, the porous composite material per se can withstand a high temperature and is suitable for industrial applications.

Another object of the present invention is that the method for the preparation of the porous composite material can be simple and easy to implement, and easy to realize large-scale preparation.

Another object of the present invention is that the method of the microwave high-temperature heating of or microwave pyrolysis of substances comprising organic compounds by using the porous composite material can achieve efficient operation, and the pyrolyzed products can achieve high added value, and especially are mainly lighter components (especially gas phase or small molecule gas).

Another object of the present invention is to provide a method for the microwave high-temperature pyrolysis of circuit boards to achieve effective recycling of resources. The pyrolyzed gas products can be gases with high recycling value, and the solid residues can easily realize the separation of metal and non-metal components, and realize the efficient recovery of metals and glass fiber, thereby achieving the clean and efficient recovery of all components of the waste circuit boards.

The above objects of the present invention can be achieved by a porous composite material capable of generating electric arcs in a microwave field. The porous composite material capable of generating electric arcs in a microwave field comprises an inorganic porous framework and a carbon material supported on the inorganic porous framework.

Specifically, according to a first aspect, the present invention provides a porous composite material capable of generating electric arcs in a microwave field, comprising an inorganic porous framework and a carbon material supported on the inorganic porous framework, wherein the average pore diameter of the inorganic porous framework is 0.2-1000 µm.

Herein, the term "supported" means that the carbon material is fixed to the surface and/or in structure of the inorganic porous framework through a specific binding force. The surface refers to all the interfaces of the porous framework that can be in contact with the gas phase. The term "fixed in the structure" refers to being inlaid or anchored inside the porous framework per se, rather than inside the pore channels.

Electric arc refers to a gas discharge phenomenon, and it is a beam of high-temperature ionized gas and also a kind of plasma.

The carbon material may be at least one selected from the group consisting of graphene, carbon nanotubes, carbon nanofibers, graphite, carbon black, carbon fibers, carbon dots, carbon nanowires, products obtained by carbonization of an carbonizable organic matter and products after carbonization of a mixture of a carbonizable organic matter, preferably at least one selected from the group consisting of graphene, carbon nanotubes, products obtained by carbonization of an carbonizable organic matter and products after carbonization of a mixture of a carbonizable organic matter.

The carbonization refers to a process of treating an organic matter under the conditions of a certain temperature and atmosphere, wherein all or most of the hydrogen, oxygen, nitrogen, sulfur, etc. in the organic matter are volatilized, thereby obtaining a synthetic material with high carbon content.

The carbonizable organic matter refers to organic polymer compounds, including
- synthetic organic polymer compounds, preferably rubbers, or plastics, including thermosetting plastics and thermoplastics, and more preferably at least one selected from the group consisting of epoxy resin, phenolic resin, furan resin, polystyrene, styrene-divinylbenzene copolymer, polyacrylonitrile, polyaniline, polypyrrole, polythiophene, styrene butadiene rubber and polyurethane rubber; and
- natural organic polymer compounds, preferably at least one selected from the group consisting of starch, viscose fiber, lignin and cellulose.

The mixture comprising a carbonizable organic matter refers to the mixture of a carbonizable organic matter and other metal-free organic matter and/or metal-free inorganic matter; preferably is at least one selected from the group consisting of coal, natural pitch, petroleum pitch or coal tar pitch.

The proportion of the carbon material may be 0.001%-99%, preferably 0.01%-90%, and more preferably 0.1%-80%, based on the total mass of the porous composite material.

The inorganic porous framework refers to an inorganic material with a porous structure. The average pore diameter of the inorganic porous framework is 0.2-1000 µm, preferably 0.2-500 µm, more preferably 0.5-500 µm, particularly preferably 0.5-250 µm, or 0.2-250 µm. The porosity of the inorganic porous framework may be 1%-99.99%, preferably 10%-99.9%, and more preferably 30%-99%.

Herein, the average pore diameter is measured by a scanning electron microscope (SEM). Firstly, the pore diameter of an individual pore is determined by the smallest value of the distance between the two intersection points of the straight line passing through the center of the individual pore and the outline of the pore in the SEM photograph; then, the average pore diameter is determined by the number-averaged value of the pore diameter values of all the pores shown in the SEM photograph.

The porosity is determined with reference to GB/T 23561.4-2009.

The inorganic material may be one or a combination of more of carbon, silicate, aluminate, borate, phosphate, germanate, titanate, oxide, nitride, carbide, boride, sulfide, silicide and halide; preferably one or a combination of more of carbon, silicate, titanate, oxide, carbide, nitride and boride. The oxide may be at least one selected from the group consisting of aluminum oxide, silicon oxide, zirconium oxide, magnesium oxide, cerium oxide and titanium oxide. The nitride may be at least one selected from the group consisting of silicon nitride, boron nitride, zirconium nitride, hafnium nitride and tantalum nitride. The carbide may be at least one selected from the group consisting of silicon carbide, zirconium carbide, hafnium carbide and tantalum carbide. The boride may be at least one selected from the group consisting of zirconium boride, hafnium boride and tantalum boride. The inorganic material of the inorganic porous framework is more preferably at least one selected from the group consisting of carbon, silicate, aluminum oxide, magnesium oxide, zirconium oxide, silicon carbide, boron nitride, and potassium titanate.

Preferably, the inorganic porous framework is at least one of the following frameworks: a carbon framework obtained after carbonization of a polymer sponge, a porous framework constituted by inorganic fibers, an inorganic sponge framework, a framework constituted by packing of inorganic particles, a ceramic porous framework obtained after baking a ceramic porous framework precursor, a ceramic fiber framework obtained after baking a ceramic fiber framework precursor; preferably a framework after carbonization of melamine sponge, a framework after carbonization of phenolic resin sponge, a porous framework of aluminum silicate fiber (such as aluminum silicate rock wool), a porous framework of mullite fiber, a porous framework of alumina fiber (such as alumina fiber board), a porous framework of zirconia fiber, a porous framework of magnesium oxide fiber, a porous framework of boron nitride fiber, a porous framework of boron carbide fiber, a porous framework of silicon carbide fiber, a porous framework of potassium titanate fiber, and a ceramic fiber framework obtained after baking a ceramic fiber framework precursor.

The porous structure of the inorganic porous framework can be from the pore structure of the framework material itself, such as the sponge-like structural form; or from the pore structure formed by the packing of fiber materials, such as fiber cotton, fiber felt, fiberboard and other structural forms; or from the pore structure formed by the packing of granular materials, such as the sand pile structural form; or from a combination of the above various forms. It is preferably from the pore structure formed by the packing of fiber materials. It should be specially noted that for the porous framework constituted by inorganic fibers as described above, the "porous" therein refers to the pore structure in the framework formed by the packing of fiber materials, but does not mean that the fibers per se are porous.

The porous composite material according to the present invention can generate high-temperature electric arcs in microwave field, for example, in a 900 w microwave field, the porous composite material can generate electric arcs that can raise the temperature thereof to above 1000° C., and the porous composite material per se can withstand high temperatures, which are up to 3000° C. This porous composite material capable of generating electric arcs in a microwave field according to the present invention is an efficient microwave heating material.

Preparation Method

According to a second aspect, the present invention provides a method for the preparation of the porous composite material according to the present invention. The preparation method according to the present invention comprises the following steps:

(1) immersing the inorganic porous framework or inorganic porous framework precursor into a solution or dispersion of the carbon material and/or carbon material precursor, so that the pores of the inorganic porous framework or inorganic porous framework precursor are filled with the solution or dispersion;

(2) heating and drying the porous material obtained in step (1), so that the carbon material or the carbon material precursor is precipitated or solidified and supported on the inorganic porous framework or the inorganic porous framework precursor;

(3) further performing the following step if at least one of the carbon material precursor or the inorganic porous framework precursor is used as a starting material: heating the porous material obtained in step (2) under an inert gas atmosphere to convert the inorganic porous framework precursor into an inorganic porous framework, and/or reduce or carbonize the carbon material precursor.

The solution or dispersion of the carbon material or its precursor in step (1) may comprise a solvent selected from the following: one or a combination thereof of benzene, toluene, xylene, trichlorobenzene, chloroform, cyclohexane, ethyl caproate, butyl acetate, carbon disulfide, ketone, acetone, cyclohexanone, tetrahydrofuran, dimethylformamide, water and alcohol; wherein the alcohol is preferably at least one selected from the group consisting of propanol, n-butanol, isobutanol, ethylene glycol, propylene glycol, 1,4-butanediol, isopropanol and ethanol.

The carbon material precursor for supporting used in the preparation method of the present invention is preferably a precursor that can be dissolved or dispersed in a solvent, which is friendly to the human body and the environment, before supporting, making the preparation process "green". The solvent, which is friendly to the human body and the environment, is at least one selected from the group consisting of ethanol, water and a mixture of the two, that is, the solvent in step (1) is more preferably a solvent comprising water and/or ethanol; and further preferably water and/or ethanol.

The solution or dispersion only needs to achieve the sufficient dissolution or sufficient dispersion of the carbon material and/or the carbon material precursor in the solvent. Generally, its concentration can be 0.001-1 g/mL, preferably 0.002-0.8 g/mL, and further preferably 0.003 g-0.5 g/mL.

The heating and drying in step (2) can be carried out at a temperature of 50-250° C., preferably 60-200° C., and more preferably 80-180° C.; microwave heating is preferred. The power of the microwave may be 1 W-100 KW, and preferably 500 W-10 KW. The microwave heating time may be 2-200 min, and preferably 20-200 min.

The inorganic porous framework precursor is a porous material that can be converted into an inorganic porous framework, and can be at least one selected from the group consisting of ceramic precursors, porous materials of a carbonizable organic matter or porous materials of a mixture of a carbonizable organic matter.

The carbon material precursor may be at least one of graphene oxide, modified carbon nanotubes, modified carbon nanofibers, modified graphite, modified carbon black, modified carbon fibers and carbonizable organic matters or mixtures comprising a carbonizable organic matter. Modified carbon nanotubes, modified carbon nanofibers, modified graphite, modified carbon black, and modified carbon fibers refer to the carbon materials that are pretreated in order to improve the dispersibility of these carbon materials in water or organic solvents and obtain stable dispersions. For example, pretreatment is performed with dispersing agents and surfactants, or pretreatment is performed by grafting hydrophilic groups, etc. These pretreatment means all adopt the pretreatment means for improving dispersibility in the prior art. All the carbon materials subjected to the above pretreatments, such as aqueous dispersion of graphene, ethanol dispersion of graphene, aqueous slurry of graphene, oily slurry of graphene, aqueous dispersion of graphene oxide, ethanol dispersion of graphene oxide, N-methylpyrrolidone dispersion of graphene oxide, aqueous dispersion of carbon nanotubes, aqueous dispersion of carboxylated carbon nanotube, ethanol dispersion of carbon nanotubes, dimethylformamide dispersion of carbon nanotubes, N-methylpyrrolidone slurry of carbon nanotubes, etc., can also be obtained commercially.

The heating temperature of step (3) can be 400-1800° C., preferably 600-1500° C., and more preferably 800-1200° C.; microwave heating is preferred. The microwave power may be 100 W-100 KW, and preferably 700 W-20 KW. The microwave heating time may be 0.5-200 min, and preferably 1-100 min.

In one embodiment, the preparation method comprises the following steps:

a. preparing a solution or dispersion of carbon material or carbon material precursor for supporting;

b. immersing an inorganic porous framework or an inorganic porous framework precursor in the solution or dispersion of step a, so that the pores of the inorganic porous framework or the inorganic porous framework precursor are filled with the solution or dispersion; the carbon material and/or carbon material precursor comprising 0.001%-99.999%, preferably 0.01%-99.99%, and more preferably 0.1%-99.9% of the total mass of the inorganic porous framework material or the inorganic porous framework material precursor and the carbon material and/or the carbon material precursor;

c. withdrawing the porous material obtained in step b, followed by heating and drying, so that the carbon material or carbon material precursor is precipitated or solidified, and supported on the inorganic porous framework or the inorganic porous framework precursor; the heating and drying temperature being 50-250° C., preferably 60-200° C., and more preferably 80-180° C.;

obtaining the porous composite material capable of generating electric arcs in a microwave field after step c, if the above starting materials used are carbon material and inorganic porous framework;

and further performing the following step d, if the starting materials used comprise at least one of the carbon material precursor or the inorganic porous framework precursor, d. heating the porous material obtained in step c under an inert gas atmosphere, to convert the inorganic porous framework precursor into an inorganic porous framework, and/or reduce or carbonize the carbon material precursor, to thereby obtain the porous composite material capable of generating electric arcs in a microwave field; the heating temperature being 400-1800° C., preferably 600-1500° C., and more preferably 800-1200° C.

When the carbon material supported on the inorganic porous framework in the preparation method according to the present invention is graphene, an aqueous solution of graphene oxide is preferably used in step (1) or step a.

When the carbon material supported on the inorganic porous framework is carbon nanotubes, a dispersion of carbon nanotubes is preferably used in step (1) or step a.

When a thermosetting plastic is selected as the carbon material precursor for supporting, in step (1) or step a, a suitable curing system needs to be formulated according to the conventional curing formulation of the selected thermosetting plastic in the prior art. In the curing system, optional one or more additives selected from the following group may be added: curing accelerators, dyes, pigments, colorants, antioxidants, stabilizers, plasticizers, lubricants, flow modifiers or aids, flame retardants, anti-dripping agents, anti-caking agents, adhesion promoters, conductive agents, polyvalent metal ions, impact modifiers, release aids, nucleating agents, etc. The amounts of the additives used may be conventional amounts; or can be adjusted according to actual conditions. When a thermosetting plastic is selected as the carbon material precursor for supporting, after heating in the subsequent step c, the thermosetting resin used as the carbon material precursor is cured and supported on the inorganic porous framework.

When a thermosetting plastic is selected as the carbon material precursor for supporting, in step (1) or step a, a corresponding good solvent in the prior art is selected to dissolve the above thermosetting plastic and its curing system to obtain a carbon material precursor solution for supporting.

When a thermoplastic is selected as the carbon material precursor for supporting, the solution of the carbon material precursor for supporting can be added with antioxidants, co-antioxidants, heat stabilizers, light stabilizers, ozone stabilizers, processing aids, plasticizers, softeners, anti-blocking agents, foaming agents, dyes, pigments, waxes, extenders, organic acids, flame retardants, coupling agents and other additives commonly used in the prior art during plastic processing. The amounts of additives used can be conventional amounts or can be adjusted according to actual circumstance.

In the preparation method according to the present invention, the pores of the inorganic porous framework can be filled with the solution or dispersion of the carbon material or carbon material precursor for supporting by squeezing several times or not squeezing at all.

After the porous material obtained in step (1) is withdrawn in step (2) of the preparation method according to the present invention, measures can be taken or not to remove the excess solution or dispersion of the carbon material or carbon material precursor for supporting in the porous material obtained in step (1). The above measures include, but are not limited to, one or two of the squeezing and centrifugal operations.

The heating in steps (2) and (3) of the preparation method according to the present invention may preferably be microwave heating, which not only is efficient but also can achieve uniform heating.

Specifically, in step (2), the power of the microwave may be 1 W-100 KW, preferably 500 W-10 KW, and the microwave irradiation time is 2-200 min, preferably 20-200 min.

In step (3), the power of the microwave may be 100 W-100 KW, preferably 700 W-20 KW; and the microwave irradiation time is 0.5-200 min, preferably 1-100 min.

The heating in step (3) of the preparation method according to the present invention needs to be performed under an inert gas atmosphere, which is selected from the inert gas atmospheres commonly used in the prior art, preferably nitrogen.

The devices used in the preparation method according to the present invention are all common ones.

Applications

The porous composite material according to the present invention exhibits excellent mechanical properties due to the combination of the inorganic porous framework and the carbon material, and unexpectedly, can generate electric arcs in a microwave field to rapidly generate a high temperature; for example, in a 900 w microwave field, can generate the electric arcs that can raise the temperature of the porous composite material to above 1000° C.; and thereby it can be used in the fields such as microwave high temperature heating, biomass pyrolysis, vegetable oil treatment, waste polymer material pyrolysis, petrochemical pyrolysis, carbon fiber composite material recycling, garbage treatment, VOC waste gas treatment, COD sewage treatment and high temperature catalysis. At the same time, the porous composite material per se is resistant to high temperatures, and its preparation process is simple and easy to implement, which makes the large-scale preparation easily realized.

Therefore, according to a third aspect, the present invention provides use of the porous composite material according to the present invention for microwave high-temperature heating, pyrolysis and recycling of substances comprising organic compounds (for example, organic matters, mixtures comprising organic matters or composite materials comprising organic matters), high-temperature catalysis and other fields, particularly the use for biomass pyrolysis, vegetable oil treatment, waste polymer material pyrolysis, petrochemical pyrolysis, carbon fiber composite material recycling, garbage treatment, VOC waste gas treatment or COD sewage treatment.

Petrochemical pyrolysis means that in the petrochemical production process, petroleum fractionation products (including petroleum gas) are commonly used as the raw material, and a higher temperature than pyrolysis is used to break the long-chain hydrocarbon molecules into various short-chain gaseous hydrocarbons and a small amount of liquid hydrocarbons to provide organic chemical raw materials.

The porous composite material according to the present invention may be particularly suitable for pyrolyzing and/or recycling substances comprising organic compounds.

Thus according to a fourth aspect, the present invention provides a method for pyrolyzing and/or recycling a substance comprising an organic compound, wherein the substance comprising an organic compound is contacted with the porous composite material according to the present invention, under an inert atmosphere or under vacuum, a microwave field is applied to the above substance comprising an organic compound and the porous composite material, and the porous composite material generates electric arcs in the microwave field, thereby rapidly reaching a high temperature and pyrolyzing the substance comprising an organic compound.

The substance comprising an organic compound includes organic matters, mixtures comprising organic matters, and composite materials comprising organic matters, which may be selected for example from:

Waste plastics. Herein, the waste plastics refer to plastics and their mixtures for civilian, industrial and other purposes that have been used while eventually disused or replaced, including but not limited to, at least one of polyolefin, polyester (polyesters and their mixtures, such as at least one of polyethylene terephthalate, polybutylene terephthalate and polyarylate), polyamide, acrylonitrile-butadiene-styrene terpolymer, polycarbonate, polylactic acid, polyurethane, polymethylmethacrylate, polyoxymethylene, polyphenylene ether and polyphenylene sulfide, preferably at least one of polyethylene and its mixtures (including but not limited to at least one of low density polyethylene, linear low density polyethylene, medium density polyethylene, high density polyethylene and ultra-high molecular weight polyethylene, preferably at least one of low density polyethylene, linear low density polyethylene and high density polyethylene), polypropylene and its mixtures, polyvinyl chloride and its mixtures, polyethylene terephthalate, polystyrene and its mixtures (including but not limited to at least one of ordinary polystyrene, expanded polystyrene, high impact polystyrene and syndiotactic polystyrene), polyamide, acrylonitrile-butadiene-styrene terpolymer, polycarbonate, polylactic acid, polymethylmethacrylate and polyoxymethylene, more preferably, at least one of polyethylene, polypropylene, polyvinyl chloride, polyethylene terephthalate, polystyrene, polycarbonate and polyamide. The waste plastics can be mixed together and treated directly without sorting, thereby simplifying the processing procedures of the waste plastics, except that if there are special requirements for the decomposition products, the waste plastics need to be treated depending on the types.

Waste rubbers. Herein, the waste rubbers refer to rubbers and their mixtures for civilian, industrial and other purposes that have been used while eventually disused or replaced; preferably at least one of natural rubber, butadiene rubber, styrene butadiene rubber, nitrile rubber, isoprene rubber, ethylene propylene rubber, butyl rubber, neoprene, styrene-based block copolymer and silicone rubber; more preferably at least one of natural rubber, butadiene rubber, styrene butadiene rubber, isoprene rubber and ethylene propylene rubber. The waste rubbers can be mixed together and treated directly without sorting, thereby simplifying the processing procedures of the waste rubbers; except that if there are special requirements for the decomposition products, the waste rubbers need to be treated depending on the types.

Biomass. Herein, the biomass refers to various animals, plants and algae produced by photosynthesis, mainly composed of cellulose, hemicellulose and lignin, and including but not limited to, at least one of straw, bagasse, tree branches, leaves, wood chips, rice husk, rice stalk, straw, peanut husk, coconut husk, palm seed husk, walnut husk, macadamia nut husk, pistachio husk, wheat straw, corn stalk and corn cob.

Vegetable oils. Herein the vegetable oils refer to the fats and oils obtained from the fruits, seeds and germs of plants, and their mixtures. The fats and oils obtained from the fruits, seeds and germs of plants include, but are not limited to, at least one of palm oil, rapeseed oil, sunflower oil, soybean oil, peanut oil, linseed oil and castor oil, preferably at least one of palm oil, rapeseed oil, sunflower oil and soybean oil.

Carbon fiber composite materials. Herein, the carbon fiber composite materials are preferably carbon fiber reinforced polymer composite materials in the prior art. The polymer matrix composited with the carbon fibers includes but is not limited to at least one of polyethylene, polypropylene, nylon, phenolic resin and epoxy resin.

Circuit boards. Herein, the circuit boards can be various circuit boards produced under current technical conditions.

In the case of the carbon fiber composite materials, under an inert atmosphere or in a vacuum, a microwave field is applied to the carbon fiber composite material and the porous composite material, wherein the porous composite material generates electric arcs in the microwave field, thereby rapidly reaching a high temperature to pyrolyze the polymer matrix in the carbon fiber composite material, while the carbon fiber remains and is recycled.

In the case of circuit boards, the circuit board is in contact with the porous composite material, and under an inert atmosphere or under vacuum, a microwave field is applied to the circuit board and the porous composite material. The porous composite material generates electric arcs under the microwaves and quickly reaches a high temperature, thereby pyrolyzing the organic materials such as polymer synthetic resin in the circuit board and obtaining a large amount of gas products and solid residues, wherein the gases are combustible gases having a high calorific value, and the solid residues comprise metal components which have a loose structure and can be easily separated and non-metal components which are mainly glass fiber mixtures and the like.

The weight ratio of the substance comprising an organic compound to the porous composite material may be 1:99-99:1, preferably 1:50-50:1, more preferably 1:30-30:1, and more preferably 1:10-10:1.

The microwave power of the microwave field can be 1 W-100 KW, more preferably 100 W-50 KW, more preferably 200 W-50 KW, more preferably 500 W-20 KW, most preferably 700 W-20 KW, especially for example 700W, 900 W or 1500 W. The time of microwave irradiation can be 0.1-200 min; more preferably 0.5-150 min, most preferably 1-100 min. Electric arcs are generated in the microwave field; 700-3000° C., preferably 800-2500° C., and more preferably 800-2000° C. can be reached quickly, so that the organic compound in the substance comprising an organic compound is pyrolyzed.

For example, the microwave power for pyrolyzing palm oil can be 200 W-80 KW, preferably 300 W-50 KW; and the microwave irradiation time can be 0.2-200 min; preferably 0.3-150 min. The microwave power for pyrolyzing rapeseed oil can be 100 W-50 KW, preferably 200 W-30 KW; and the microwave irradiation time can be 0.1-150 min; preferably 0.2-130 min. The microwave power for pyrolyzing sunflower oil can be 80 W-60 KW, preferably 200 W-40 KW; and the microwave irradiation time can be 0.3-120 min; preferably 0.4-100 min. The microwave power for pyrolyzing soybean oil can be 120 W-40 KW, preferably 200 W-30 KW; and the microwave irradiation time can be 0.2-100 min; preferably 0.5-90 min. The microwave power for pyrolyzing peanut oil can be 100 W-10 KW, preferably 300 W-8 KW; and the microwave irradiation time can be 0.3-100 min; preferably 0.5-90 min. The microwave power for pyrolyzing linseed oil can be 150 W-80 KW, preferably 300 W-50 KW; and the microwave irradiation time can be 0.1-80 min; preferably 0.3-70 min. The microwave power for pyrolyzing castor oil can be 200 W-50 KW, preferably 300 W-40 KW; and the microwave irradiation time can be 0.5-70 min, preferably 0.6-60 min. The microwave power for pyrolyzing the straw can be 100 W-70 KW, and the microwave irradiation time can be 0.2-150 min. The microwave power for pyrolyzing the bagasse can be 80 W-50 KW, and the microwave irradiation time can be 0.2-120 min. The microwave power for pyrolyzing tree branches can be 120 W-100 KW, and the microwave irradiation time can be 0.5-200 min. The microwave power for pyrolyzing leaves can be 50 W-40 KW, and the microwave irradiation time can be 0.1-80 min. The microwave power for pyrolyzing wood chips can be 100 W-10 KW, and the microwave irradiation time can be 0.2-100 min. The microwave power for pyrolyzing rice husk can be 80 W-80 KW, and the microwave irradiation time can be 0.2-120 min. The microwave power for pyrolyzing rice stalk is 100 W-70 KW, and the microwave irradiation time is 0.2-100 min. The microwave power for pyrolyzing rice straw can be 50 W-60 KW, and the microwave irradiation time can be 0.2-60 min. The microwave power for pyrolyzing peanut shells can be 100 W-50 KW, and the microwave irradiation time can be 0.3-70 min. The microwave power for pyrolyzing coconut husk can be 200 W-80 KW, and the microwave irradiation time can be 0.5-150 min. The microwave power for pyrolyzing palm seed hulls can be 100 W-50 KW, and the microwave irradiation time can be 0.3-100 min. The microwave power for pyrolyzing corn cobs can be 80 W-50 KW, and the microwave irradiation time can be 0.2-70 min. The microwave power for pyrolyzing natural rubber can be 100 W-50 KW, and the microwave irradiation time can be 0.5-150 min. The microwave power for pyrolyzing butadiene rubber can be 120 W-60 KW, and the microwave irradiation time can be 0.5-120 min. The microwave power for pyrolyzing styrene butadiene rubber can be 150 W-80 KW, and the microwave irradiation time can be 0.6-200 min. The microwave power for pyrolyzing isoprene rubber can be 100 W-60 KW, and the microwave irradiation time can be 0.5-150 min. The microwave power for pyrolyzing ethylene propylene rubber can be 200 W-70 KW, and the microwave irradiation time can be 0.2-100 min.

The microwave field can be generated by various microwave devices in the prior art, such as a household microwave oven, industrialized microwave device (such as microwave pyrolysis reactor) and the like.

The inert atmosphere is an inert gas atmosphere commonly used in the prior art, such as nitrogen, helium, neon, argon, krypton, or xenon, preferably nitrogen.

The substance comprising an organic compound and the porous composite material can be contacted in various ways. If the substance comprising an organic compound is a solid, such as waste plastics, the substance can be placed on the porous composite material, placed in the cavity constituted by the porous composite material, or covered by the porous composite material, etc.; preferably, the solid substance (for example, a circuit board) is crushed and then comes into contact with the porous composite material. If the substance comprising an organic compound is a liquid, such as vegetable oil, one useful mode is a batch mode, that is, first, the vegetable oil is added to the porous composite material, the porous composite material will automatically absorb the vegetable oil into the pores, and then microwave pyrolyzing is performed; the other is a continuous mode, that is, upon microwave pyrolyzing, it is continuously added to the surface of the porous material through a quartz pipe using a pump (such as a peristaltic pump). The above pumping speed only needs to guarantee the residence time of the mixture of the vegetable oil and the porous composite material in the microwave field. If the substance comprising an organic compound is a mixture of a solid and a liquid, the mixed form of the above contact modes can be adopted correspondingly.

In the method of the present invention, the device used to place or carry the substance comprising an organic compound and the porous composite material can be various containers or pipes that can be penetrated by microwaves and can withstand high temperatures above 1200° C., such as quartz crucibles, quartz reactors, quartz tubes, alumina crucibles, alumina reactors, alumina tubes, etc.

The substance comprising an organic compound in the method of the present invention is gasified after pyrolyzing. The gas obtained after pyrolyzing can be collected for subsequent treatment or recycling, for example, after separation, the gas is used as fuel or as a chemical industry raw material for subsequent reaction and production. The residue after pyrolyzing is disposed as waste, or for carbon fiber composite materials, the residue after pyrolyzing is mainly carbon fiber, which can be collected to be reused after removal of impurities, or for circuit boards, the solid residue obtained from the pyrolyzing of the circuit board can be treated to separate the metal and non-metal components therein, which are recycled respectively. The above separation of the solid residue can adopt the various separation methods and devices in the prior art.

The gas collection is a common method in the prior art and can be carried out using a gas collection device, preferably under an inert atmosphere. For example, if a household microwave oven is used as the microwave field, the gas collection mode is such that in a glove box protected by nitrogen, a quartz crucible loaded with a substance comprising an organic compound and a porous composite material is placed in a vacuum bag and then sealed; after reaction under the microwaves, the crucible is opened across the vacuum bag, and a syringe is plunged into the vacuum bag for sampling. If an industrial microwave oven with a gas inlet and a gas outlet (such as a microwave pyrolysis reactor, etc.) is used, the gas collection mode is such that purging with nitrogen is performed during the reaction process, and sampling and collecting with a gas collecting bag is performed at the gas outlet.

The method of the present invention utilizes the porous composite material to generate electric arcs in a microwave field, thereby rapidly generating a high temperature to pyrolyze substances comprising organic compounds. The pyrolyzed products can be used as chemical raw materials for recycling, or valuable residues such as carbon fibers or metals left after pyrolyzing can be recycled, especially full recycling of waste circuit boards can be achieved. The process is efficient, and the product composition has high added value.

EXAMPLES

The present invention is further illustrated with reference to the following examples, but the scope of the present invention is not limited by these examples.

The experimental data in the examples were measured using the following instruments and measurement methods:

1. Determination of the mass percentage of the carbon material supported in the porous composite material obtained in the examples:
   1) In the case that in the starting materials, inorganic porous framework material was used, the weight of inorganic porous framework material as the starting material was first measured, and the weight of the obtained porous composite material was measured after the end of the experiment; the weight difference between the two was the weight of the supported carbon material, thereby the mass percentage of the supported carbon material in the porous composite material was determined.
   2) In the case that in the starting materials, inorganic porous framework precursor was used, two inorganic porous framework precursor samples of the same weight were used. One of them was used in the example according to the present invention; and the other was used in the reference example, wherein only the steps c and d of the preparation method as described above were carried out. After the end of the experiment, the weight of the porous composite material obtained in the example according to the present invention was weighed, and the final weight of the sample obtained in the reference example was weighed; the weight difference between the two was the weight of the supported carbon material, thereby the mass percentage of the supported carbon material in the porous composite material was determined.

2. Unless otherwise specified, the chromatographic analysis of the gas pyrolyzed in the following examples and comparative examples was carried out using the Agilent 6890N gas chromatograph manufactured by the company Agilent, USA as follows.

The Agilent 6890N gas chromatograph manufactured by the company Agilent, USA as used was equipped with an FID detector; involved HP-PLOT $AL_2O_3$ capillary column (50 m×0.53 mm×15 µm) as the chromatograph column; He as the carrier gas, with an average linear velocity of 41 cm/s; the inlet temperature of 200° C.; the detector temperature of 250° C.; the split ratio of 15:1; the injected sample volume of 0.25 ml (gaseous); and the temperature-increasing program, wherein the initial temperature was 55° C. and maintained for 3 min; then increased to 120° C. at 4° C./min and maintained for 4 min; further increased to 170° C. at 20° C./min and maintained for 10 minutes.

3. The average pore diameter of the inorganic porous framework and the porous composite material was determined in the following manner: the pore diameter of an individual pore was determined by the smallest value among the distances between the two intersection points of the straight line passing through the center of the individual pore and the outline of the pore in the scanning electron microscope (SEM) photograph, then the average pore diameter was determined by the number-averaged value of the pore diameter values of all the pores shown in the SEM photograph. The SEM used was Hitachi S-4800 (Hitachi, Japan) with a magnification factor of 200.

4. Method for measuring porosity: The porosity was determined with reference to GB/T 23561.4-2009.

The starting materials used in the examples were all commercially available.

Preparation of the Porous Composite Material

Example 1

(1) 500 ml of an aqueous dispersion of the graphene oxide (JCGO-95-1-2.6-W, 10 mg/ml, Nanjing Ji Cang Nano Tech Co., LTD.) was measured out and placed in a beaker;

(2) 2 g of a porous framework composed of a phenolic resin (a phenolic foam, an average pore diameter of 300 µm, a porosity of 99%, Changshu Smithers-Oasis Floral Foam Co., Ltd) was immersed into the aqueous dispersion of the graphene oxide, so that the dispersion sufficiently entered into the pore channels of the porous framework;

(3) the immersed porous material was withdrawn and placed on a stainless steel tray, which was placed in an oven at 180° C. and heated for 1 hour, thereby the material was dried and pre-reduced; and (4) the dried porous material was placed in a household microwave oven (700 w, model M1-L213B, Midea) for microwave treatment under a high power for 2 minutes to reduce the pre-reduced graphene oxide to graphene and carbonize the phenolic resin framework into carbon framework (an average pore diameter of 200 µm, and a porosity of 99%), thereby a porous composite material with the graphene supported on the carbon porous framework capable of generating electric arcs in a microwave field was obtained, wherein the graphene comprised 10% of the total mass of the porous composite material.

Example 2

(1) 500 ml of a dispersion of the carbon nanotubes (XFWDM, 100 mg/ml, Nanjing XFNANO Materials Tech Co., Ltd.) was measured out and placed in a beaker;

(2) 2 g of a porous framework composed of a phenolic resin (a phenolic foam, an average pore diameter of 200 µm, a porosity of 99%, Changshu Smithers-Oasis Floral Foam Co., Ltd) was immersed into the dispersion of the carbon nanotubes, so that the dispersion of the carbon nanotubes sufficiently entered into the pore channels of the porous framework;

(3) the immersed porous material was withdrawn and placed on a stainless steel tray, which was placed in an oven at 80° C. and heated for 5 hours, thereby the material was dried; and (4) the dried porous material was placed in a tube furnace and carbonized at 800° C. for 1 hour under a nitrogen atmosphere, and a porous composite material with the carbon nanotubes supported on the carbon porous framework capable of generating electric arcs in a microwave field (wherein the carbon framework had an average pore diameter of 140 µm and a porosity of 99%) was obtained, wherein the carbon nanotubes comprised 30% of the total mass of the porous composite material.

Example 3

(1) 500 ml of a dispersion of the carbon nanotubes (XFWDM, 100 mg/ml, Nanjing XFNANO Materials Tech Co., Ltd.) was measured out and placed in a beaker;

(2) 5 g of a fibrous cotton-like porous framework composed of a silicate (an average pore diameter of 150 μm, and a porosity of 90%, Shandong Luyang Energy-saving Materials Co., Ltd.) was immersed into the dispersion of the carbon nanotubes and squeezed several times so that the dispersion sufficiently entered into the pore channels of the porous framework; and (3) the immersed porous material was withdrawn and placed on a stainless steel tray, which was placed in an oven at 150° C. and heated for 2 hours, thereby the material was dried and a porous composite material with the carbon nanotubes supported on the silicate fiber porous framework capable of generating electric arcs in a microwave field was obtained, wherein the carbon nanotubes comprised 10% of the total mass of the porous composite material.

Example 4

(1) 30 g of a powdered phenolic resin (2123, Xinxiang Bomafengfan Industry Co., Ltd.) and 3.6 g of hexamethylenetetramine curing agent were weighed and placed in a beaker, to which 500 ml of ethanol was poured, and the mixture was stirred with a magnetic rotor for 1 hour until the components were all dissolved;

(2) 5 g of a fibrous cotton-like porous framework composed of a silicate (an average pore diameter of 150 μm, and a porosity of 90%, Shandong Luyang Energy-saving Materials Co., Ltd.) was immersed into the formulated solution and squeezed several times, so that the solution sufficiently entered into the pore channels of the porous framework;

(3) the immersed porous material was withdrawn and placed on a stainless steel tray, which was placed in an oven at 180° C. and heated for 2 hours, thereby the material was dried to remove the solvent so that the phenolic resin was cured; and (4) the dried and cured porous material was placed in a tube furnace and carbonized at 1000° C. for 1 hour under a nitrogen atmosphere to carbonize the phenolic resin, thereby a porous composite material with the phenolic resin carbonized product supported on the silicate fiber porous framework capable of generating electric arcs in a microwave field was obtained, wherein the carbon material comprised 5% of the total mass of the porous composite material.

Example 5

(1) 50 g of a liquid phenolic resin (2152, Dining Baiyi Chemicals) was weighed and placed in a beaker, to which 500 ml of ethanol was poured, followed by stirring with a magnetic rotor for 1 hour until the component was all dissolved;

(2) 8 g of a fiberboard-like porous framework composed of alumina (an average pore diameter of 100 μm, and a porosity of 85%, Shandong Luyang Energy-saving Materials Co., Ltd.) was immersed into the formulated solution, so that the solution sufficiently entered into the pore channels of the porous framework;

(3) the immersed porous material was withdrawn and placed on a stainless steel tray, which was placed in an oven at 180° C. and heated for 2 hours, thereby the material was dried to remove the solvent so that the phenolic resin was cured; and (4) the dried and cured porous material was placed in a tube furnace and carbonized at 900° C. for 1 hour under a nitrogen atmosphere to carbonize the phenolic resin, thereby a porous composite material with the phenolic resin carbonized product supported on the alumina fiber porous framework capable of generating electric arcs in a microwave field was obtained, wherein the carbon material comprised 6% of the total mass of the porous composite material.

Example 6

(1) 30 g of a water-soluble starch (medicinal grade, item number: S104454, Shanghai Aladdin Bio-Chem Technology Co., LTD) was weighed and placed in a beaker, to which 500 ml of deionized water was poured, followed by stirring for 1 hour with a magnetic rotor until the component was all dissolved;

(2) 8 g of a fiber mat-like porous framework composed of alumina (an average pore diameter of 100 μm, and a porosity of 85%, Shandong Luyang Energy-saving Materials Co., Ltd.) was immersed into the formulated solution, so that the solution sufficiently entered into the pore channels of the porous framework;

(3) the immersed porous material was withdrawn and placed into a microwave pyrolysis reactor (XOLJ-2000N, Nanjing Atpio Instrument Manufacturing Co., Ltd) for microwave treatment at a power of 10 KW for 2 minutes to dry the porous material; and (4) the dried porous material was placed in a tube furnace and carbonized at 1200° C. for 1 hour under a nitrogen atmosphere to carbonize the water-soluble starch, thereby a porous composite material with the starch carbonized product supported on the alumina fiber porous framework capable of generating electric arcs in a microwave field was obtained, wherein the carbon material comprised 0.1% of the total mass of the porous composite material.

Example 7

(1) 50 g of a water-soluble starch (medicinal grade, item number: S104454, Shanghai Aladdin Bio-Chem Technology Co., LTD) was weighed and placed in a beaker, to which 500 ml of deionized water was poured, followed by stirring for 1 hour with a magnetic rotor until the component was all dissolved;

(2) 8 g of a fiber cotton-like porous framework composed of alumina (an average pore diameter of 100 μm, and a porosity of 85%, Shandong Luyang Energy-saving Materials Co., Ltd.) was immersed into the formulated solution and squeezed several times, so that the solution sufficiently entered into the pore channels of the porous framework;

(3) the immersed porous material was withdrawn and placed into a microwave pyrolysis reactor (XOLJ-2000N, Nanjing Atpio Instrument Manufacturing Co., Ltd) for microwave treatment at a power of 500 W for 2 h to dry the porous material; and (4) the dried porous material was placed in a tube furnace and carbonized at 1000° C. for 1 hour under a nitrogen atmosphere to carbonize the starch, thereby a porous composite material with the starch carbonized product supported on the alumina fiber porous framework capable of generating electric arcs in a microwave field was obtained, wherein the carbon material comprised 0.2% of the total mass of the porous composite material.

Example 8

(1) 2 kg of a liquid phenolic resin (2152, Dining Baiyi Chemicals) was weighed and placed in a beaker, to which 4 L of ethanol was poured, followed by stirring with a magnetic rotor for 1 hour until the component was all dissolved;

(2) 2 g of a porous framework composed of a phenolic resin (a phenolic foam, an average pore diameter of 500 μm, a porosity of 99%, Changshu Smithers-Oasis Floral Foam Co., Ltd) was immersed into the formulated solution, so that the solution sufficiently entered into the pore channels of the porous framework;

(3) the immersed porous material was withdrawn and placed on a stainless steel tray, which was placed in an oven at 150° C. and heated for 2 hours, thereby the material was dried; and (4) the dried porous material was placed in a microwave pyrolysis reactor (XOLJ-2000N, Nanjing Atpio Instrument Manufacturing Co., Ltd.) for microwave treatment at a power of 20 KW for 100 minutes under a nitrogen atmosphere, thereby a porous composite material with the phenolic resin carbonized product supported on the carbon porous framework capable of generating electric arcs in a microwave field (wherein the carbon framework had an average pore diameter of 350 μm and a porosity of 99%) was obtained, wherein the carbon material supported on the inorganic carbon framework comprised 80% of the total mass of the porous composite material.

Example 9

(1) 0.3 g of a liquid phenolic resin (2152, Jining Baiyi Chemicals) was weighed and placed in a beaker, to which 100 ml of ethanol was poured, followed by stirring with a magnetic rotor for 1 hour until the component was all dissolved;

(2) 300 g of an active alumina (an average pore diameter of 0.05 μm, and a porosity of 30%, Shandong Kaiou Chemical Technology Co., Ltd.) was immersed into the formulated solution, so that the solution sufficiently entered into the pore channels of the active alumina;

(3) the immersed porous material was withdrawn and placed on a stainless steel tray, which was placed in an oven at 150° C. and heated for 2 hours, thereby the material was dried; and (4) the dried porous material was placed in a tube furnace and carbonized at 1000° C. for 1 hour under a nitrogen atmosphere to carbonize the phenolic resin, thereby a porous composite material with the phenolic resin carbonized product supported on the active alumina (porous framework) capable of generating electric arcs in a microwave field was obtained, wherein the carbon material comprised 0.05% of the total mass of the porous composite material.

Example 10

(1) 30 g of a powdered phenolic resin (2123, Xinxiang Bomafengfan Industry Co., Ltd.) and 3.6 g of hexamethylenetetramine curing agent were weighed and placed in a beaker, to which 500 ml of ethanol was poured, followed by stirring with a magnetic rotor for 1 hour until dissolution;

(2) 8 g of a fiberboard-like porous framework composed of magnesium oxide (an average pore diameter of 100 μm, and a porosity of 80%, Jinan Huolong Thermal Ceramics Co., Ltd.) was immersed into the formulated solution, so that the solution sufficiently entered into the pore channels of the porous framework;

(3) the immersed porous material was withdrawn and placed on a stainless steel tray, which was placed in an oven at 180° C. and heated for 2 hours, thereby the material was dried to remove the solvent so that the phenolic resin was cured; and (4) the dried and cured porous material was placed in a tube furnace and carbonized at 1000° C. for 1 hour under a nitrogen atmosphere to carbonize the phenolic resin, thereby a porous composite material with the phenolic resin carbonized product supported on the magnesium oxide fiber porous framework capable of generating electric arcs in a microwave field was obtained, wherein the carbon material comprised 3% of the total mass of the porous composite material.

Example 11

(1) 100 g of a water-soluble starch (medicinal grade, Shanghai Aladdin Bio-Chem Technology Co., LTD) was weighed and placed in a beaker, to which 500 ml of deionized water was poured, followed by stirring for 1 hour with a magnetic rotor until the component was all dissolved;

(2) 8 g of a fiberboard-like porous framework composed of zirconia (an average pore diameter of 150 μm, and a porosity of 80%, Jinan Huolong Thermal Ceramics Co., Ltd.) was immersed into the formulated solution, so that the solution sufficiently entered into the pore channels of the porous framework;

(3) the immersed porous material was withdrawn and placed into a microwave pyrolysis reactor (XOLJ-2000N, Nanjing Atpio Instrument Manufacturing Co., Ltd) for microwave treatment at a power of 3 KW for 20 minutes to dry the porous material; and (4) the dried porous material was placed in a tube furnace and carbonized at 900° C. for 2 hours under a nitrogen atmosphere to carbonize the starch, thereby a porous composite material with the starch carbonized product supported on the zirconia fiber porous framework capable of generating electric arcs in a microwave field was obtained, wherein the carbon material comprised 0.5% of the total mass of the porous composite material.

Example 12

(1) 50 g of a liquid phenolic resin (2152, Dining Baiyi Chemicals) was weighed and placed in a beaker, to which 500 ml of ethanol was poured, followed by stirring with a magnetic rotor for 1 hour until the component was all dissolved;

(2) 8 g of a fiberboard-like porous framework composed of boron nitride (an average pore diameter of 100 μm, and a porosity of 80%, Jinan Huolong Thermal Ceramics Co., Ltd.) was immersed into the formulated solution, so that the solution sufficiently entered into the pore channels of the porous framework;

(3) the immersed porous material was withdrawn and placed on a stainless steel tray, which was placed in an oven at 180° C. and heated for 2 hours, thereby the material was dried to remove the solvent so that the phenolic resin was cured; and (4) the dried and cured porous material was placed in a tube furnace and carbonized at 900° C. for 1 hour under a nitrogen atmosphere to carbonize the phenolic resin, thereby a porous composite material with the phenolic resin carbonized product supported on the boron nitride fiber porous framework capable of generating electric arcs in a microwave field was obtained, wherein the carbon material comprised 5% of the total mass of the porous composite material.

Example 13

(1) 100 g of a liquid phenolic resin (2152, Jining Baiyi Chemicals) was weighed and placed in a beaker, to which 500 ml of ethanol was poured, followed by stirring with a magnetic rotor for 1 hour until the component was all dissolved;

(2) 8 g of a fiberboard-like porous framework composed of silicon carbide (an average pore diameter of 100 µm, and a porosity of 80%, Jinan Huolong Thermal Ceramics Co., Ltd.) was immersed into the formulated solution, so that the solution sufficiently entered into the pore channels of the porous framework;

(3) the immersed porous material was withdrawn and placed on a stainless steel tray, which was placed in an oven at 180° C. and heated for 2 hours, thereby the material was dried to remove the solvent so that the phenolic resin was cured; and (4) the dried and cured porous material was placed in a tube furnace and carbonized at 800° C. for 1 hour under a nitrogen atmosphere to carbonize the phenolic resin, thereby a porous composite material with the phenolic resin carbonized product supported on the silicon carbide fiber porous framework capable of generating electric arcs in a microwave field was obtained, wherein the carbon material comprised 10% of the total mass of the porous composite material.

Example 14

(1) 100 g of a liquid phenolic resin (2152, Jining Baiyi Chemicals) was weighed and placed in a beaker, to which 500 ml of ethanol was poured, followed by stirring with a magnetic rotor for 1 hour until the component was all dissolved;

(2) 8 g of a fiberboard-like porous framework composed of potassium titanate (an average pore diameter of 100 µm, and a porosity of 80%, Jinan Huolong Thermal Ceramics Co., Ltd.) was immersed into the formulated solution, so that the solution sufficiently entered into the pore channels of the porous framework;

(3) the immersed porous material was withdrawn and placed on a stainless steel tray, which was placed in an oven at 180° C. and heated for 2 hours, thereby the material was dried to remove the solvent so that the phenolic resin was cured; and (4) the dried and cured porous material was placed in a tube furnace and carbonized at 800° C. for 1 hour under a nitrogen atmosphere to carbonize the phenolic resin, thereby a porous composite material with the phenolic resin carbonized product supported on the potassium titanate fiber porous framework capable of generating electric arcs in a microwave field was obtained, wherein the carbon material comprised 10% of the total mass of the porous composite material.

Microwave Pyrolyzing of Waste Plastics:

Example 15

0.5 g each of the beverage bottle body (PET), beverage bottle cap (HDPE), greenhouse film (LLDPE), PP pellets, PP lunch box fragments, package polystyrene (PS) foam, acrylonitrile-butadiene-styrene terpolymer tray (ABS), nylon pipe fragments (PA6) and transparent water cup (PC) and 0.5 g of polyvinyl chloride (PVC) hose were scissored or weighed out and placed on 1 g of the porous composite material obtained in Example 1 respectively, followed by high-power microwave pyrolyzing for 30 s in a household microwave oven (700 w) after protection with nitrogen. With the aid of the porous composite material obtained in Example 1, all the materials were pyrolyzed and gasified after being microwave treated by a household microwave oven (700 w) for a short period of 30 seconds. There was almost no residue, and only a small amount of black substance remained in the case of the polyvinyl chloride (PVC) hose. Vigorous arc discharge phenomenon was observed in all processes. The porous composite material generated electric arcs in the microwave field, thereby rapidly generating a high temperature and transferring heat to the materials to quickly pyrolyze the materials.

The samples obtained in Examples 2-14 were used to perform the same experiment as that in the above process, and similar experimental phenomenon and result were obtained. All the porous composite materials obtained in Examples 2-14 could generate electric arcs in the microwave field, thereby rapidly generating a high temperature and transferring heat to the materials to rapidly pyrolyze the materials.

Example 16

50 g of beverage bottle cap (HDPE), 50 g of PP lunch box fragments, 50 g of acrylonitrile-butadiene-styrene terpolymer tray (ABS), 50 g of nylon tube fragments (PA6) and 50 g of transparent water cup (PC), 3 g of package foam (PS), 10 g of greenhouse film (LLDPE), 50 g of beverage bottle body (PET), 50 g of disposable transparent plastic cup (PS) fragments and 50 g of polyvinyl chloride (PVC) hose fragments were scissored and placed respectively inside the cavity constituted by 30 g of the porous composite material obtained in Example 1, followed by treatment using the microwave pyrolysis reactor (XOLJ-2000N, Nanjing Atpio Instrument Manufacturing Co., Ltd) at a power of 1500 W for 5 minutes after protection with nitrogen. Almost no residue was seen for all the materials, and only a small amount of black substance remained in the case of polyvinyl chloride hose.

Placement of the materials to be pyrolyzed inside the cavity constituted by the porous composite material that generated electric arcs in the microwaves was specifically operated as follows: first placing a part of the porous composite material at the bottom of and around the quartz reactor to form a cavity having an upward opening, then placing the materials inside the cavity, and finally covering the top of the materials with the remaining porous composite material.

The samples obtained in Examples 2-14 were used to perform the same experiment as that in the above process, and similar experimental phenomenon and result were obtained. All the porous composite materials obtained in Examples 2-14 could generate electric arcs in the microwaves, thereby rapidly generating a high temperature and transferring it to the materials to rapidly pyrolyze the materials.

Comparative Example 1

0.5 g of beverage bottle cap (HDPE) fragments, 0.5 g of PP lunch box fragments, 0.5 g of PET bottle body fragments, PS foam and 0.5 g of PVC hose were respectively placed on 1 g of silicon carbide powder (98.5%, Sinopharm Chemical Reagent Beijing Co., Ltd.), followed by high-power microwave treatment for 30 s in a household microwave oven (700 w) after protection with nitrogen. There was no spark for all the materials during the microwave process. After the microwave treatment, the HDPE bottle cap, PP lunch box fragments, PET fragments, PS foam and PVC hose all did not change, and only the bottom of the quartz crucible was slightly warm.

Comparative Example 2

0.5 g of beverage bottle cap (HDPE) fragments were placed on 1 g of activated carbon powder (AR, ≥200 mesh, item number C112223, Shanghai Aladdin Bio-Chem Technology Co., LTD), followed by high-power microwave treatment for 30 s in a household microwave oven (700 w) after protection with nitrogen. During the microwave process, electric arcs appeared from time to time. After the microwave treatment, the HDPE bottle cap melted, but did not disappear completely. The weight loss of the HDPE was found to be 25% after weighing.

Example 17

Except for the following parameters, other parameters and steps were the same as those in Example 15:

1 g of the sample obtained in Example 1 was used for pyrolyzing 0.5 g of HDPE, 0.5 g of PP and 0.5 g of LLDPE, respectively, using a microwave pyrolysis reactor (XOLJ-2000N, Nanjing Atpio Instrument Manufacturing Co., Ltd) at a power of 700 W for 30 s (or using a household microwave oven (700 W) at a high power for 30 s), then the obtained gas was subjected to chromatographic analysis, wherein the main ingredients detected were shown in Table 1-1.

1 g of the sample obtained in Example 1 was used for pyrolyzing 0.5 g of PET using a microwave pyrolysis reactor (XOLJ-2000N, Nanjing Atpio Instrument Manufacturing Co., Ltd) at a power of 700 W for 30 s (or using a household microwave oven (700 W) at a high power for 30 s), then the obtained gas was subjected to chromatographic analysis, wherein the main ingredients detected were shown in Table 1-2.

1 g of the sample obtained in Example 1 was used for pyrolyzing 0.5 g of PS using a microwave pyrolysis reactor (XOLJ-2000N, Nanjing Atpio Instrument Manufacturing Co., Ltd) at a power of 700 W for 30 s (or using a household microwave oven (700 W) at a high power for 30 s), then the obtained gas was subjected to chromatographic analysis, wherein the main ingredients detected were shown in Table 1-3.

1 g of the sample obtained in Example 1 was used for pyrolyzing 0.5 g of PVC using a household microwave oven (700 W) at a high power for 30 s, then the obtained gas was subjected to chromatographic analysis, wherein the main ingredients detected were shown in Table 1-4.

TABLE 1-1

| Materials | Methane vol % | Ethane Propane vol % | Ethylene vol % | Propylene vol % | Acetylene Propyne vol % | 1-Butene Isobutylene vol % | 1,3-butadiene vol % | Others vol % |
|---|---|---|---|---|---|---|---|---|
| HDPE | 10 | 6 | 35 | 15 | 4 | 5 | 8 | 17 |
| PP | 17 | 6 | 24 | 23 | 4 | 10 | 3 | 13 |
| LLDPE | 16 | 7 | 26 | 21 | 4 | 6 | 5 | 15 |

TABLE 1-2

| Materials | Methane vol % | Ethylene vol % | Propylene vol % | Acetaldehyde vol % | Benzene vol % | Toluene vol % | Styrene vol % | Others vol % |
|---|---|---|---|---|---|---|---|---|
| PET | 10 | 6 | 1 | 8 | 63 | 3 | 1 | 8 |

TABLE 1-3

| Materials | Methane vol % | Ethylene vol % | Benzene vol % | Toluene vol % | Styrene vol % | Benzaldehyde vol % | β-Nitrostyrene vol % | Others vol % |
|---|---|---|---|---|---|---|---|---|
| PS | 8 | 20 | 31 | 12 | 7 | 4 | 11 | 7 |

TABLE 1-4

| Materials | Methane vol % | Ethane vol % | Ethylene vol % | Propylene vol % | Acetylene vol % | Vinyl chloride vol % | Hydrogen chloride vol % | Others vol % |
|---|---|---|---|---|---|---|---|---|
| PVC | 16 | 5 | 20 | 17 | 4 | 21 | 4 | 13 |

Example 18

Except for the following parameters, other parameters and steps were the same as those in Example 15:

30 g of the sample obtained in Example 6 was used for pyrolyzing 50 g of HDPE, 50 g of PP and 50 g of LLDPE using a microwave pyrolysis reactor at a power of 1500 W for 10 min, then the obtained gas was subjected to chromatographic analysis, wherein the main ingredients detected are shown in Table 2-1.

30 g of the sample obtained in Example 6 was used for pyrolyzing 50 g of PET using a microwave pyrolysis reactor at a power of 1500 W for 20 min, then the obtained gas was subjected to chromatographic analysis, wherein the main ingredients detected are shown in Table 2-2.

30 g of the sample obtained in Example 6 was used for pyrolyzing 3 g of PS using a microwave pyrolysis reactor at a power of 1500 W for 40 min, then the obtained gas was subjected to chromatographic analysis, wherein the main ingredients detected are shown in Table 2-3.

30 g of the sample obtained in Example 6 was used for pyrolyzing 50 g of disposable transparent plastic cup (PS) fragments using a microwave pyrolysis reactor at a power of 1500 W for 15 min, then the obtained gas was subjected to chromatographic analysis, wherein the main ingredients detected are shown in Table 2-4.

30 g of the sample obtained in Example 6 was used for pyrolyzing 50 g of PVC hose fragments using a microwave pyrolysis reactor at a power of 1500 W for 15 min, then the obtained gas was subjected to chromatographic analysis, wherein the main ingredients detected are shown in Table 2-5.

TABLE 2-1

| Materials | Methane vol % | Ethane Propane vol % | Ethylene vol % | Propylene vol % | Acetylene Propyne vol % | 1-Butene Isobutylene vol % | 1,3-Butadiene vol % | Others vol % |
|---|---|---|---|---|---|---|---|---|
| HDPE | 24 | 5 | 40 | 11 | 5 | 2 | 5 | 8 |
| PP | 13 | 7 | 17 | 31 | 4 | 14 | 3 | 11 |
| LLDPE | 25 | 6 | 29 | 18 | 5 | 4 | 3 | 10 |

TABLE 2-2

| Materials | Methane vol % | Ethylene vol % | Propylene vol % | Acetaldehyde vol % | Benzene vol % | Toluene vol % | Styrene vol % | Others vol % |
|---|---|---|---|---|---|---|---|---|
| PET | 34 | 15 | 4 | 2 | 35 | 2 | 1 | 7 |

TABLE 2-3

| Materials | Methane vol % | Ethylene vol % | Propylene vol % | Acetylene Propyne vol % | Benzene vol % | Toluene vol % | Styrene vol % | Others vol % |
|---|---|---|---|---|---|---|---|---|
| PS | 33 | 46 | 4 | 8 | 3 | 1 | 1 | 4 |

TABLE 2-4

| Materials | Methane vol % | Ethylene vol % | Propylene vol % | Acetylene Propyne vol % | Benzene vol % | Toluene vol % | Styrene vol % | Others (vol %) |
|---|---|---|---|---|---|---|---|---|
| PS | 30 | 43 | 3 | 7 | 5 | 2 | 1 | 9 |

TABLE 2-5

| Materials | Methane vol % | Ethane vol % | Ethylene vol % | Propylene vol % | Acetylene vol % | Vinyl chloride vol % | Hydrogen chloride vol % | Others vol % |
|---|---|---|---|---|---|---|---|---|
| PVC | 22 | 4 | 23 | 17 | 3 | 18 | 2 | 11 |

Comparative Example 3

(1) 50 g of a liquid phenolic resin (2152, Dining Baiyi Chemicals) was weighed out and placed in a beaker, to which 500 ml of ethanol was poured, followed by stirring with a magnetic rotor for 1 hour until the component was all dissolved;

(2) 8 g of a fiberboard-like porous framework composed of alumina (an average pore diameter of 100 nm, Pu-Yuan Nanotechnology limited company, Hefei, China) was immersed into the formulated solution so that the solution sufficiently entered into the pore channels of the porous framework;

(3) the immersed porous material was withdrawn and placed on a stainless steel tray, which was placed in an oven at 180° C. and heated for 2 hours, thereby achieving drying to remove the solvent and curing the phenolic resin; and (4) the dried and cured porous material was placed in a tube furnace and carbonized at 900° C. for 1 hour under a nitrogen atmosphere to carbonize the phenolic resin.

0.5 g of beverage bottle cap (HDPE) fragments were placed on 1 of the material obtained in step (4), followed by high-power microwave treatment in a household microwave oven (700 w) for 30 s after protection with nitrogen. There was no spark at all during the microwave treatment, and after the microwave treatment the HDPE bottle cap did not change. It could be seen that when the pore diameter of the inorganic porous framework is small, no porous composite material, which could generate electric arcs in a microwave field to achieve effective pyrolyzing, was obtained.

Microwave Pyrolyzing of Vegetable Oils:

Example 19

Each of palm oil, rapeseed oil, sunflower oil and soybean oil in 0.5 g was placed on 1 g of the porous composite material obtained in Example 1, respectively; the oil was automatically absorbed by the porous composite material; after protection with nitrogen, the mixed materials were subjected to high-power microwave pyrolyzing for 30 s in a household microwave oven (700 w) (or to pyrolyzing using a microwave pyrolysis reactor (XOLJ-2000N, Nanjing Atpio Instrument Manufacturing Co., Ltd) at a power of 700 W for 30 s), and then the weighing showed that there was almost no residue of the materials in the porous composite material. With the aid of the porous composite material obtained in Example 1, all the materials were pyrolyzed and gasified after being microwave (700 w) treated for a short period of 30 seconds, and during the process, vigorous arc discharge phenomenon was observed. The porous composite material generated electric arcs in the microwave field, thereby rapidly generating a high temperature and transferring heat to the materials to quickly pyrolyze the materials. The gas obtained after pyrolyzing was subjected to chromatographic analysis, wherein the main ingredients detected are shown in Table 3-1.

Example 20

Each of palm oil, rapeseed oil, sunflower oil and soybean oil in 100 g was placed in a beaker respectively; 30 g of the porous composite material obtained in Example 1 was placed in a quartz reactor which was purged with 500 ml/min of nitrogen for 10 minutes, followed by adjusting the flow rate to 100 ml/min; the microwave pyrolysis reactor (XOLJ-2000N, Nanjing Atpio Instrument Manufacturing Co., Ltd) was started at a power of 1500 W; and the above vegetable oil was continuously added to the surface of the porous composite material in the quartz reactor through a quartz capillary at a rate of about 2 g/min using a peristaltic pump (LongerPump BT100-2J precision peristaltic pump); the materials were continuously pyrolyzed into gas, and almost no materials remained after the end of the operation.

The porous composite materials obtained in Examples 2-14 were used to perform the same experiment as that in the above process, and similar experimental phenomenon and results were obtained.

Comparative Example 4

0.5 g of palm oil was added dropwise on 1 g of silicon carbide powder (98.5%, Sinopharm Chemical Reagent Beijing Co., Ltd.), followed by high-power microwave treatment for 30 s in a household microwave oven (700 w) after protection with nitrogen. There was no spark at all during the microwave process, and only the bottom of the quartz crucible was slightly warm. After the microwave treatment, the weighing showed that the mass of the palm oil did not change obviously.

Example 21

Except for the following parameters, other parameters and steps were the same as those in Example 19: 30 g of the sample obtained in Example 6 was used for pyrolyzing 100 g of palm oil, of rapeseed oil, of sunflower oil and of soybean oil, respectively, at a feed rate of 2 g/min using a microwave pyrolysis reactor at a power of 1500 W, then the obtained gas was subjected to chromatographic analysis, wherein the main ingredients detected are shown in Table 3-2.

TABLE 3-1

| Materials | Methane vol % | Ethane vol % | Ethylene vol % | Propylene vol % | 1-Butene vol % | 1,3-Butadiene vol % | Others vol % |
|---|---|---|---|---|---|---|---|
| Palm oil | 13 | 4 | 49 | 16 | 5 | 8 | 5 |
| Rapeseed oil | 14 | 6 | 45 | 13 | 4 | 8 | 10 |
| Sunflower oil | 11 | 5 | 47 | 14 | 5 | 7 | 11 |
| Soybean oil | 15 | 5 | 43 | 11 | 7 | 9 | 10 |

TABLE 3-2

| Materials | Methane vol % | Ethane vol % | Ethylene vol % | Propylene vol % | 1-Butene vol % | 1,3-Butadiene vol % | Others vol % |
|---|---|---|---|---|---|---|---|
| Palm oil | 24 | 5 | 42 | 13 | 5 | 5 | 6 |
| Rapeseed oil | 22 | 6 | 40 | 15 | 4 | 4 | 9 |
| Sunflower oil | 21 | 5 | 37 | 14 | 5 | 5 | 13 |
| Soybean oil | 22 | 5 | 35 | 15 | 5 | 7 | 11 |

Microwave Pyrolyzing of Biomass

Example 22

0.5 g of each of straw, bagasse, tree branches, leaves, wood chips, rice husk, rice straw, peanut husk, coconut husk, palm seed husk and corn cob were respectively placed on 1 g of the porous composite material obtained in Example 1, followed by high-power microwave pyrolyzing for 30 s in a household microwave oven (700 w) after protection with nitrogen. With the aid of the porous composite material obtained in Example 1, all the materials were pyrolyzed and gasified after being microwave treated by a household microwave oven (700 w) for a short period of 30 seconds, and only black substance remained. Vigorous arc discharge phenomenon was observed during said process. The porous composite material generated electric arcs in the microwaves, thereby rapidly generating a high temperature and transferring heat to the materials to quickly pyrolyze the materials. 50 g of each of straw, bagasse, tree branches, leaves, wood chips, rice husk, rice straw, peanut husk, coconut husk, palm seed husk and corn cob were placed respectively inside the cavity constituted by 30 g of the porous composite material obtained in Example 1, followed by treatment using the microwave pyrolysis reactor (XOLJ-2000N, Nanjing Atpio Instrument Manufacturing Co., Ltd) at a power of 1500 W for 5 minutes after protection with nitrogen. For all the materials, only black substance remained.

The samples obtained in Examples 2-14 were used to perform the same experiment as that in the above process, and similar experimental phenomenon and results were obtained.

Comparative Example 5

0.5 g of rice husk was placed on 1 g of silicon carbide powder (98.5%, Sinopharm Chemical Reagent Beijing Co., Ltd.), followed by high-power microwave treatment for 30 s in a household microwave oven (700 w) after protection with nitrogen. There was no spark at all during the microwave process. After the microwave treatment, the rice husk did not change, and only the bottom of the quartz crucible was slightly warm.

Example 23

Except for the following parameters, other parameters and steps were the same as those in Example 22:

1 g of the sample obtained in Example 1 was used for pyrolyzing 0.5 g of straw and of rice husk, respectively, using a household microwave oven (700 W) at a high power for 30 s, then the obtained gas was subjected to chromatographic analysis, wherein the main ingredients detected other than CO and $CO_2$ are shown in Table 4-1.

30 g of the sample obtained in Example 6 was used for pyrolyzing 50 g of straw and of rice husk, respectively, using a microwave pyrolysis reactor at a power of 1500 W for 15 min, then the obtained gas was subjected to chromatographic analysis, wherein the main ingredients detected other than CO and $CO_2$ are shown in Table 4-2.

TABLE 4-1

| Materials | Methane vol % | Ethane vol % | Ethylene vol % | Propylene vol % | 1,3-Butadiene vol % | Benzene vol % | Toluene vol % | Others vol % |
|---|---|---|---|---|---|---|---|---|
| Straw | 21 | 7 | 34 | 11 | 3 | 6 | 3 | 15 |
| Rice husk | 19 | 6 | 38 | 13 | 4 | 4 | 2 | 14 |

TABLE 4-2

| Materials | Methane vol % | Ethane vol % | Ethylene vol % | Propylene vol % | 1,3-Butadiene vol % | Benzene vol % | Toluene vol % | Others vol % |
|---|---|---|---|---|---|---|---|---|
| Straw | 36 | 6 | 25 | 9 | 2 | 5 | 4 | 13 |
| Rice husk | 37 | 5 | 28 | 8 | 5 | 5 | 3 | 9 |

Placement of the materials to be pyrolyzed inside the cavity constituted by the porous composite material was specifically operated as follows: first placing a part of the porous composite material at the bottom of and around the quartz reactor to form a cavity having an upward opening, then placing the materials inside the cavity, and finally covering the top of the materials with the remaining porous composite material.

Microwave Pyrolyzing of Waste Rubbers

Example 24

0.5 g of each of car tire (Hankook) fragments, styrene-butadiene rubber (Beijing Rubber Products Factory) and ethylene-propylene rubber (Beijing Rubber Products Factory) samples were respectively placed on 1 g of the porous composite material obtained in Example 1, followed by high-power microwave pyrolyzing for 30 s in a household microwave oven (700 w) after protection with nitrogen. With the aid of the porous composite material obtained in Example 1, all the materials were pyrolyzed and gasified after being microwave treated by a household microwave oven (700 w) for a short period of 30 seconds; for the car tire fragments, there only remained a black substance that was crushed in one pinch; and for the styrene-butadiene rubber and the ethylene-propylene rubber samples, no residue was left. Vigorous arc discharge phenomenon was observed during said process. The porous composite material generated electric arcs in the microwaves, thereby rapidly generating a high temperature and transferring heat to the materials to quickly pyrolyze the materials.

50 g of each of car tire (Hankook) fragments, styrene-butadiene rubber (Beijing Rubber Products Factory) and ethylene-propylene rubber (Beijing Rubber Products Factory) samples were placed respectively inside the cavity constituted by 30 g of the porous composite material that generated electric arcs in microwaves obtained in Example 1, followed by treatment using the microwave pyrolysis reactor (XOLJ-2000N, Nanjing Atpio Instrument Manufacturing Co., Ltd) at a power of 1500 W for 5 minutes after protection with nitrogen. All the materials were pyrolyzed and gasified after being microwave treated by a household microwave oven (700 w) for a short period of 30 seconds; for the car tire fragments, there only remained a black substance that was crushed in one pinch; and for the styrene-butadiene rubber and the ethylene-propylene rubber samples, no residue was left.

Placement of the materials to be pyrolyzed inside the cavity constituted by the porous composite material was specifically operated as follows: first placing a part of the porous composite material at the bottom of and around the quartz reactor to form a cavity having an upward opening, then placing the materials inside the cavity, and finally covering the top of the materials with the remaining porous composite material.

The porous composite materials obtained in Examples 2-14 were used to perform the same experiment as that in the above process, and similar experimental phenomenon and results were obtained.

Comparative Example 6

0.5 g of styrene-butadiene rubber sample was placed on 1 g of silicon carbide powder (98.5%, Sinopharm Chemical Reagent Beijing Co., Ltd.), followed by high-power microwave treatment for 30 s in a household microwave oven (700 w) after protection with nitrogen. There was no spark at all during the microwave treatment process. After the microwave treatment, the styrene-butadiene rubber sample did not change, and only the bottom of the quartz crucible was slightly warm.

Example 25

0.5 g of each of car tire (Hankook) fragments, styrene-butadiene rubber (Beijing Rubber Products Factory) and ethylene-propylene rubber (Beijing Rubber Products Factory) samples were respectively placed on 1 g of the porous composite material obtained in Example 1, followed by high-power microwave pyrolyzing for 30 s in a household microwave oven (700 w) after protection with nitrogen, then the obtained gas was subjected to chromatographic analysis, wherein the main ingredients detected other than CO and $CO_2$ are shown in Tables 5-1, 5-2 and 5-3.

With the same steps described above, 30 g of the sample obtained in Example 6 was used for respectively pyrolyzing 50 g of each of car tire (Hankook) fragments, styrene-butadiene rubber (Beijing Rubber Products Factory) and ethylene-propylene rubber (Beijing Rubber Products Factory) samples using a microwave pyrolysis reactor at a power of 1500 W for 15 min, then the obtained gas was subjected to chromatographic analysis, wherein the main ingredients detected other than CO and $CO_2$ are shown in Tables 5-4, 5-5 and 5-6.

TABLE 5-1

| Materials | Methane vol % | Ethylene vol % | Propylene vol % | Benzene vol % | Toluene vol % | Styrene vol % | β-Nitrostyrene vol % | Others vol % |
|---|---|---|---|---|---|---|---|---|
| Tire | 8 | 20 | 12 | 26 | 9 | 7 | 5 | 13 |

TABLE 5-2

| Materials | Methane vol % | Ethylene vol % | Benzene vol % | Toluene vol % | Styrene vol % | Benzaldehyde vol % | β-Nitrostyrene vol % | Others vol % |
|---|---|---|---|---|---|---|---|---|
| Styrene-butadiene rubber | 10 | 24 | 29 | 7 | 6 | 4 | 9 | 11 |

TABLE 5-3

| Materials | Methane vol % | Ethane Propane vol % | Ethylene vol % | Propylene vol % | Acetylene Propyne vol % | 1-Butene Isobutylene vol % | 1,3-Butadiene vol % | Others vol % |
|---|---|---|---|---|---|---|---|---|
| Ethylene-propylene rubber | 13 | 5 | 31 | 23 | 4 | 9 | 3 | 12 |

TABLE 5-4

| Materials | Methane vol % | Ethylene vol % | Propylene vol % | Acetylene Propyne vol % | Benzene vol % | Toluene vol % | Styrene vol % | Others vol % |
|---|---|---|---|---|---|---|---|---|
| Tire | 25 | 37 | 8 | 5 | 10 | 2 | 1 | 12 |

TABLE 5-5

| Materials | Methane vol % | Ethylene vol % | Propylene vol % | Acetylene Propyne vol % | Benzene vol % | Toluene vol % | Styrene vol % | Others vol % |
|---|---|---|---|---|---|---|---|---|
| Styrene-butadiene rubber | 30 | 44 | 5 | 7 | 3 | 1 | 1 | 9 |

TABLE 5-6

| Materials | Methane vol % | Ethane Propane vol % | Ethylene vol % | Propylene vol % | Acetylene Propyne vol % | 1-Butene Isobutylene vol % | 1,3-Butadiene vol % | Others vol % |
|---|---|---|---|---|---|---|---|---|
| Ethylene-propylene rubber | 15 | 8 | 17 | 30 | 5 | 12 | 3 | 10 |

Microwave Pyrolyzing of Carbon Fiber Composite Material:

Example 26

2 g of carbon fiber reinforced epoxy resin composite material (Changzhou Huatan Fiber Composite Co., Ltd.) was placed on 1 g of the porous composite material obtained in Example 1, followed by high-power microwave pyrolyzing for 40 s in a household microwave oven (700 w) after protection with nitrogen. The carbon fiber composite material was taken out, and after weighing, the weight loss was found; and the carbon fiber could be easily peeled off. Vigorous arc discharge phenomenon was observed during the microwave process. The porous composite material generated electric arcs in the microwaves, thereby rapidly generating a high temperature and transferring heat to the materials to quickly pyrolyze the materials.

50 g of carbon fiber reinforced epoxy resin composite material (Changzhou Huatan Fiber Composite Co., Ltd.) was placed inside the cavity constituted by 30 g of the porous composite material that generated electric arcs in microwaves obtained in Example 1, followed by treatment using the microwave pyrolysis reactor (XOLJ-2000N, Nanjing Atpio Instrument Manufacturing Co., Ltd) at a power of 1500 W for 5 minutes after protection with nitrogen. The carbon fiber composite material was taken out, and after weighing, the weight loss was found, and the carbon fiber could be easily peeled from the fabric.

Placement of the materials to be pyrolyzed inside the cavity constituted by the porous composite material that generated electric arcs in microwaves was specifically operated as follows: first placing a part of the porous composite material that generated electric arcs in microwaves at the bottom of and around the quartz reactor to form a cavity having an upward opening, then placing the materials inside the cavity, and finally covering the top of the materials with the remaining porous composite material.

The samples obtained in Examples 2-14 were used to perform the same experiment as that in the above process, and similar experimental phenomenon and results were obtained. All the porous composite materials obtained in Examples 2-14 could generate electric arcs in the microwaves, thereby rapidly generating a high temperature and transferring it to the materials to rapidly pyrolyze the materials.

Comparative Example 7

2 g of carbon fiber reinforced epoxy resin composite material (Changzhou Huatan Fiber Composite Co., Ltd.) was placed on 1 g of silicon carbide powder (98.5%, Sinopharm Chemical Reagent Beijing Co., Ltd.), followed by high-power microwave treatment for 30 s in a household microwave oven (700 w) after protection with nitrogen. There was no spark at all during the microwave treatment process. After the microwave treatment, the material did not change, and only the bottom of the quartz crucible was slightly warm.

Example 27

2 g of carbon fiber reinforced epoxy resin composite material (Changzhou Huatan Fiber Composite Co., Ltd.) was placed on 1 g of the porous composite material that generated electric arcs in microwaves obtained in Example 1, followed by high-power microwave pyrolyzing for 40 s in a household microwave oven (700 w) after protection with nitrogen, then taking out the carbon fiber composite material. After weighing, the weight loss of 36% was found, and the carbon fiber could be easily peeled from the fabric. The collected gas was subjected to chromatographic analysis, wherein the main ingredients detected are shown in Table 6.

30 g of carbon fiber reinforced polypropylene composite material (Changzhou Huatan Fiber Composite Co., Ltd.) was placed inside the cavity constituted by 30 g of the porous composite material that generated electric arcs in microwaves obtained in Example 6, followed by treatment using the microwave pyrolysis reactor (XOLJ-2000N, Nanjing Atpio Instrument Manufacturing Co., Ltd) at a power of 1500 W for 5 minutes after protection with nitrogen. After weighing, the weight loss of 38% was found, and the carbon fiber could be easily peeled from the fabric. The collected gas was subjected to chromatographic analysis, wherein the main ingredients detected are shown in Table 6.

50 g of carbon fiber reinforced nylon composite material (Changzhou Huatan Fiber Composite Co., Ltd.) was placed inside the cavity constituted by 30 g of the porous composite material that generated electric arcs in microwaves obtained in Example 7, followed by treatment using the microwave pyrolysis reactor (XOLJ-2000N, Nanjing Atpio Instrument Manufacturing Co., Ltd) at a power of 2000 W for 10 minutes after protection with nitrogen. After weighing, the weight loss of 39% was found, and the carbon fiber could be easily peeled from the fabric. The collected gas was subjected to chromatographic analysis, wherein the main ingredients detected are shown in Table 6.

Placement of the materials inside the cavity constituted by the porous composite material that generated electric arcs in microwaves was specifically operated as follows: first placing a part of the porous composite material that generated electric arcs in microwaves at the bottom of and around the quartz reactor to form a cavity having an upward opening, then placing the materials inside the cavity, and finally covering the top of the materials with the remaining porous composite material.

TABLE 6

| Materials | Methane vol % | Ethane Propane vol % | Ethylene vol % | Propylene vol % | Acetylene Propyne vol % | 1-Butene Isobutylene vol % | 1,3-Butadiene vol % | Others vol % |
|---|---|---|---|---|---|---|---|---|
| Carbon fiber reinforced epoxy composite material | 28 | 6 | 15 | 20 | 3 | 11 | 3 | 14 |
| Carbon fiber reinforced polypropylene composite material | 13 | 7 | 17 | 31 | 4 | 14 | 3 | 11 |
| Carbon fiber reinforced nylon composite material | 15 | 8 | 22 | 20 | 3 | 7 | 3 | 22 |

Microwave Pyrolyzing of Circuit Board:

In the following examples, the collected gases were chromatographically analyzed as follows: the gas product collected after pyrolyzing was analyzed using a refinery gas analyzer (HP Agilent 7890 A, configured with 3 channels, including 1 FID and 2 TCDs (thermal conductivity detector)) in accordance with the ASTM D1945-14 method. Hydrocarbons were analyzed on the FID channel. One TCD using a nitrogen carrier gas was used to determine the hydrogen content, because there was a small difference between hydrogen and helium carrier gases in conductivity. The other TCD using helium as the carrier gas was used to detect CO, $CO_2$, $N_2$, and $O_2$. For quantitative analysis, the response factor was determined by using RGA (refinery gas analysis) calibration gas standards.

Example 28

10 g of waste circuit board (the waste circuit board had been pre-broken into small pieces which were irregular pieces with an area of about 1 $cm^2$; the circuit board was disassembled from waste computer motherboard, brand Gigabyte) was placed inside the cavity constituted by 50 g of the porous composite material obtained in Example 1, then the entirety was placed in a microwave pyrolysis reactor (Qingdao Makewave Instrument Manufacturing Co., Ltd., model MKX-R1C1B), protected by nitrogen, and treated with the microwave pyrolysis reactor at a power of 900 W for 5 minutes. The porous composite material generated electric arcs in the microwaves, thereby rapidly generating a high temperature and transferring it to the materials to quickly pyrolyze the materials. The gas components collected were subjected to gas chromatographic analysis.

The main ingredients of the pyrolyzed gas product are shown in Table 7-1. After the end of the reaction, the mass of solid residue was 30% of that before pyrolyzing, including metal components which had a loose structure and could be easily separated and non-metal components which were mainly glass fiber mixtures and the like. After simple crushing, the metal part and non-metal part (mainly glass fiber) therein could be separated and recovered.

The placement of the circuit board to be pyrolyzed inside the cavity constituted by the porous composite material was specifically operated as follows: first placing a part of the porous composite material inside the quartz reactor, arranging the porous composite material in sequence to form a hollow cavity having an upward opening, then putting the waste circuit board inside the cavity, and finally covering the top of the materials with the remaining porous composite material.

The samples obtained in Examples 2-14 were used to perform the same experiment as that in the above process, and similar experimental phenomenon and results were obtained. The mass of solid residue after the end of the reaction was about 28% to 35% of that before pyrolyzing. All the porous composite materials obtained in Examples 2-14 could generate electric arcs in a microwave field, thereby rapidly generating a high temperature and transferring it to the materials to rapidly pyrolyze the materials.

Comparative Example 8

10 g of waste circuit board and 50 g of silicon carbide powder (98.5%, Sinopharm Chemical Reagent Beijing Co., Ltd.) were mixed uniformly and then placed in a quartz reaction tank; subsequently, the entirety was placed in a microwave reactor (MKX-R1C1B, Qingdao Makewave Instrument Manufacturing Co., Ltd.), protected by nitrogen, and then treated with the microwave pyrolysis reactor at a power of 900 W for 5 minutes. There was no spark at all during the microwave process, the waste circuit board did not change after the microwave treatment, and only the bottom of the quartz reaction tank was slightly warm.

Example 29

Except for the following parameters, other parameters and steps were the same as those in Example 28:

10 g of waste circuit board and 30 g of the porous composite material that generated electric arcs in microwaves obtained in Example 6 were mixed uniformly and then placed in a quartz reaction tank; subsequently, the entirety was placed in a microwave pyrolysis reactor, and after protection by nitrogen, was treated with the microwave pyrolysis reactor at a power of 1200 W for 10 minutes. The porous composite material generated electric arcs in the microwaves, thereby rapidly generating a high temperature and transferring it to the materials to quickly pyrolyze the materials. The gas components collected were subjected to gas chromatographic analysis. The main ingredients of the pyrolysis gas product are shown in Table 7-2. The mass of the solid residue after the end of the reaction was 32% of that before the pyrolysis. Further, the metal and the substrate had a loose structure therebetween, and by simple crushing, the metal and non-metal parts therein could be separated and recovered.

Example 30

Except for the following parameters, other parameters and steps were the same as those in Example 28:

10 g of waste circuit board and 15 g of the porous composite material that generated electric arcs in microwaves obtained in Example 2 were mixed uniformly and then placed in a quartz reaction tank; subsequently, the entirety was placed in a microwave pyrolysis reactor, and after protection by nitrogen, was treated with the microwave pyrolysis reactor at a power of 900 W for 20 minutes. The porous composite material generated electric arcs in the microwaves, thereby rapidly generating a high temperature and transferring it to the materials to quickly pyrolyze the materials. The gas components collected were subjected to gas chromatographic analysis. The main ingredients of the pyrolysis gas product are shown in Table 7-3. The mass of the solid residue after the end of the reaction was 30% of that before the pyrolysis. Further, the metal and the substrate had a loose structure therebetween, and by simple crushing, the metal and non-metal parts therein could be separated and recovered.

Example 31

Except for the following parameters, other parameters and steps were the same as those in Example 28:

2 g of waste circuit board and 60 g of the porous composite material that generated electric arcs in microwaves obtained in Example 11 were mixed uniformly and then placed in a quartz reaction tank; subsequently, the entirety was placed in a microwave pyrolysis reactor, and after protection by nitrogen, was treated with the microwave pyrolysis reactor at a power of 900 W for 5 minutes. The porous composite material generated electric arcs in the microwaves, thereby rapidly generating a high temperature and transferring it to the materials to quickly pyrolyze the materials. The gas components collected were subjected to gas chromatographic analysis. The main ingredients of the pyrolysis gas product are shown in Table 7-4. The mass of the solid residue after the end of the reaction was 30% of that before the pyrolysis. Further, the metal and the substrate had a loose structure therebetween, and by simple crushing, the metal and non-metal parts therein could be separated and recovered.

Example 32

Except for the following parameters, other parameters and steps were the same as those in Example 28:

20 g of waste circuit board and 5 g of the porous composite material that generated electric arcs in microwaves obtained in Example 8 were mixed uniformly and then placed in a quartz reaction tank; subsequently, the entirety was placed in a microwave pyrolysis reactor, and after protection by nitrogen, was treated with the microwave pyrolysis reactor at a power of 1000 W for 30 minutes. The porous composite material generated electric arcs in the microwaves, thereby rapidly generating a high temperature and transferring it to the materials to quickly pyrolyze the materials. The gas components collected were subjected to gas chromatographic analysis. The main ingredients of the pyrolysis gas product are shown in Table 7-5. The mass of the solid residue after the end of the reaction was 31% of that before the pyrolysis. Further, the metal and the substrate had a loose structure therebetween, and by simple crushing, the metal and non-metal parts therein could be separated and recovered.

TABLE 7-1

| The composition of Gas product | Volume proportion (vol. %) |
| --- | --- |
| Hydrogen | 20.36 |
| Carbon monoxide | 53.25 |
| Carbon dioxide | 12.72 |
| Methane | 3.81 |
| Ethane | 0.39 |
| Ethylene | 5.02 |
| Propane | 0.14 |
| Propylene | 0.90 |
| Acetylene | 1.35 |
| 1-Butene | 0.42 |
| 1,3-Butadiene | 0.05 |
| Benzene | 0.09 |
| Others | 1.50 |

TABLE 7-2

| The composition of Gas product | Volume proportion (vol. %) |
| --- | --- |
| Hydrogen | 18.00 |
| Carbon monoxide | 42.80 |
| Carbon dioxide | 6.90 |

TABLE 7-2-continued

| The composition of Gas product | Volume proportion (vol. %) |
| --- | --- |
| Methane | 14.90 |
| Ethane | 2.00 |
| Ethylene | 6.00 |
| Propane | 1.00 |
| Propylene | 4.70 |
| Acetylene | 1.10 |
| 1-Butene | 0.20 |
| 1,3-Butadiene | 0.60 |
| Benzene | 0.10 |
| Others | 1.70 |

TABLE 7-3

| The composition of Gas product | Volume proportion (vol. %) |
| --- | --- |
| Hydrogen | 15.00 |
| Carbon monoxide | 49.60 |
| Carbon dioxide | 9.10 |
| Methane | 13.50 |
| Ethane | 2.30 |
| Ethylene | 4.20 |
| Propane | 0.80 |
| Propylene | 2.20 |
| Acetylene | 0.90 |
| 1-Butene | 0.10 |
| 1,3-Butadiene | 0.60 |
| Benzene | 0.10 |
| Others | 1.60 |

TABLE 7-4

| The composition of Gas product | Volume proportion (vol. %) |
| --- | --- |
| Hydrogen | 19.47 |
| Carbon monoxide | 48.80 |
| Carbon dioxide | 7.25 |
| Methane | 8.80 |
| Ethane | 1.0 |
| Ethylene | 8.80 |
| Propane | 0.10 |
| Propylene | 3.20 |
| Acetylene | 0.80 |
| 1-Butene | 0.30 |
| 1,3-Butadiene | 0.07 |
| Benzene | 0.08 |
| Others | 1.33 |

TABLE 7-5

| The composition of Gas product | Volume proportion (vol. %) |
| --- | --- |
| Hydrogen | 16.20 |
| Carbon monoxide | 47.32 |
| Carbon dioxide | 8.68 |
| Methane | 10.1 |
| Ethane | 1.80 |
| Ethylene | 6.60 |
| Propane | 2.32 |
| Propylene | 4.10 |
| Acetylene | 0.80 |
| 1-Butene | 0.08 |
| 1,3-Butadiene | 0.10 |
| Benzene | 0.20 |
| Others | 1.70 |

It could also be seen from the data in the tables that the pyrolyzed product comprised a relatively high proportion of hydrogen, which thus could be collected and used as fuel.

The invention claimed is:

1. A porous composite material, comprising an inorganic porous framework and a carbon material supported on the inorganic porous framework,
   wherein the average pore diameter of the inorganic porous framework is 0.2-1000 μm,
   wherein the inorganic porous framework has a porous structure and is at least one selected from the group consisting of;
   a carbon framework obtained after carbonization of melamine sponge,
   a carbon framework obtained after carbonization of phenolic resin sponge,
   a porous framework constituted by an inorganic fibers, fiber selected from an aluminum silicate fiber, a mullite fiber, an alumina fiber, a zirconia fiber, a magnesium oxide fiber, a boron nitride fiber, a boron carbide fiber, a silicon carbide fiber, and a potassium titanate fiber, and
   a ceramic fiber framework obtained after baking a ceramic fiber framework precursor;
   and
   the carbon material supported on the inorganic porous framework is selected from the group consisting of graphene, carbon nanotubes, graphite, carbon black, carbon fibers, carbon dots, carbon nanowires, products obtained by carbonization of a carbonizable organic matter or a carbonizable mixture comprising the carbonizable organic matter, and combinations thereof.

2. The porous composite material according to claim 1, wherein the average pore diameter of the inorganic porous framework is 0.5-500 μm;
   and/or
   the porosity of the inorganic porous framework is 1%-99.99%.

3. The porous composite material as claimed in claim 2, wherein the average pore diameter of the inorganic porous framework is 0.5-250 μm.

4. The porous composite material as claimed in claim 2, wherein the porosity of the inorganic porous framework is 10%-99.9%.

5. The porous composite material as claimed in claim 2, wherein the porosity of the inorganic porous framework is 30%-99%.

6. The porous composite material according to claim 1, wherein the proportion of the carbon material is 0.001%-99%, based on the total mass of the porous composite material.

7. The porous composite material as claimed in claim 6, wherein the proportion of the carbon material is 0.01%-90% based on the total mass of the porous composite material.

8. The porous composite material as claimed in claim 6, wherein the proportion of the carbon material is 0.1%-80% based on the total mass of the porous composite material.

9. The porous composite material according to claim 1, wherein the carbon material is selected from the group consisting of graphene, carbon nanofibers, carbon nanotubes, products obtained by carbonization of the carbonizable organic matter or the carbonizable mixture, and combinations thereof.

10. A method for preparing the porous composite material according to claim 1, comprising:
    (1) immersing an inorganic porous framework or an inorganic porous framework precursor into a solution or dispersion of a carbon material and/or carbon material precursor, so that the pores of the inorganic porous framework or inorganic porous framework precursor are filled with the solution or dispersion;

(2) heating and drying the porous material obtained in step (1), so that the carbon material or the carbon material precursor is precipitated or solidified and supported on the inorganic porous framework or the inorganic porous framework precursor; and (3) further performing the following step if at least one of the carbon material precursor or the inorganic porous framework precursor is used as a starting material:

heating the porous material obtained in step (2) under an inert gas atmosphere to convert the inorganic porous framework precursor into an inorganic porous framework, and/or reduce or carbonize the carbon material precursor.

11. The method according to claim 10, wherein
the solution or dispersion of the carbon material or its precursor in step (1) comprises a solvent selected from the group consisting of benzene, toluene, xylene, trichlorobenzene, chloroform, cyclohexane, ethyl caproate, butyl acetate, carbon disulfide, ketone, acetone, cyclohexanone, tetrahydrofuran, dimethylformamide, water and alcohol, and combinations thereof; and/or
the concentration of the solution or dispersion in step (1) is 0.001-1 g/mL; and/or
in step (1), the carbon material and/or carbon material precursor comprises 0.001%-99.999% of the total mass of the inorganic porous framework material or the inorganic porous framework material precursor and the carbon material and/or the carbon material precursor.

12. The method as claimed in claim 11, wherein the solvent in the solution or dispersion of the carbon material or its precursor in step (1) is water and/or ethanol.

13. The method as claimed in claim 11, wherein in step (1), the carbon material and/or carbon material precursor comprises 0.1%-99.9% of the total mass of the inorganic porous framework material or the inorganic porous framework material precursor and the carbon material and/or the carbon material precursor.

14. The method according to claim 10, wherein
the heating and drying in step (2) is carried out at a temperature of 50-250° C.

15. The method according to claim 10, wherein
the inorganic porous framework precursor is selected from the group consisting of ceramic precursors, porous materials of a carbonizable organic matter or porous materials of the carbonizable mixture, and combinations thereof;
and/or
the carbon material precursor is selected from the group consisting of graphene oxide, modified carbon nanotubes, modified carbon nanofibers, modified graphite, modified carbon black, modified carbon fibers, carbonizable organic matters, the carbonizable mixture, and combinations thereof; and/or
the heating of step (3) is carried out at a temperature of 400-1800° C.

16. A method of using the porous composite material according to claim 1, wherein the porous composite material is used for microwave high-temperature heating, pyrolyzing and recycling of substances comprising organic compounds or high-temperature catalysis field.

17. A method for pyrolyzing and/or recycling a substance that comprises an organic compound,
wherein the substance is contacted with the porous composite material according to claim 1, under an inert atmosphere or under vacuum, a microwave field is applied to the above substance and the porous composite material,
and the porous composite material generates electric arcs in the microwave field, thereby rapidly reaching a high temperature to pyrolyze the organic compound comprised in the substance.

18. The method according to claim 17, wherein
the weight ratio of the substance to the porous composite material is 1:99-99:1; and/or
the microwave power of the microwave field is 1 W-100 KW; and/or
the time of microwave irradiation is 0.1-200 min.

19. The method according to claim 17, wherein the substance is carbon fiber composite material, and after the polymer matrix in the carbon fiber composite material is pyrolyzed, the remaining carbon fiber is recycled.

20. The method according to claim 17, wherein the substance is a circuit board, the method further comprises separating the solid residue obtained by pyrolyzing the circuit board to obtain a metal component and a non-metal component; and/or collecting a gas product obtained by pyrolyzing the circuit board.

21. The method according to claim 20, wherein the gas product collected is hydrogen.

22. The method as claimed in claim 17, wherein the substance that comprises an organic compound is selected from the group consisting of waste plastics, waste rubbers, biomass, vegetable oils, carbon fiber composite materials, and circuit boards.

23. The porous composite material as claimed in claim 1, wherein the synthetic organic polymer compounds are selected from rubbers, thermosetting plastics, and thermoplastics; and
the natural organic polymer compounds are at least one selected from the group consisting of starch, viscose fiber, lignin and cellulose.

24. The porous composite material as claimed in claim 23, wherein the synthetic organic polymer compounds are selected from the group consisting of epoxy resin, phenolic resin, furan resin, polystyrene, styrene-divinylbenzene copolymer, polyacrylonitrile, polyaniline, polypyrrole, polythiophene, styrene butadiene rubber, polyurethane rubber, and combinations thereof.

25. The porous composite material as claimed in claim 1, wherein the carbonizable mixture is a mixture of the carbonizable organic matter with one or more metal-free organic matter and/or one or more metal-free inorganic matter.

26. The porous composite material as claimed in claim 25, wherein the carbonizable mixture is selected from the group consisting of coal, natural pitch, petroleum pitch, coal tar pitch and combinations thereof.

* * * * *